(12) United States Patent
Chandrashekar et al.

(10) Patent No.: US 11,936,487 B2
(45) Date of Patent: Mar. 19, 2024

(54) SYSTEMS AND METHODS FOR ASSOCIATING CONTEXT TO SUBTITLES DURING LIVE EVENTS

(71) Applicant: Rovi Guides, Inc., San Jose, CA (US)

(72) Inventors: Padmassri Chandrashekar, Karnataka (IN); Daina Emmanuel, Karnataka (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/404,530

(22) Filed: Aug. 17, 2021

(65) Prior Publication Data

US 2023/0058470 A1 Feb. 23, 2023

(51) Int. Cl.
| | |
|---|---|
| *G06F 15/16* | (2006.01) |
| *G10L 15/08* | (2006.01) |
| *G10L 15/26* | (2006.01) |
| *H04L 12/18* | (2006.01) |
| *H04N 21/439* | (2011.01) |
| *H04N 21/488* | (2011.01) |

(52) U.S. Cl.
CPC ........ *H04L 12/1831* (2013.01); *G10L 15/083* (2013.01); *G10L 15/26* (2013.01); *H04N 21/4394* (2013.01); *H04N 21/4884* (2013.01)

(58) Field of Classification Search
CPC ... H04L 12/1831; G10L 15/083; G10L 15/26; H04N 21/4394; H04N 21/4884
USPC ....... 709/204; 348/14.08; 386/108; 704/235, 704/9, 10, 260
See application file for complete search history.

(56) References Cited

U.S. PATENT DOCUMENTS

| | | | | |
|---|---|---|---|---|
| 9,031,839 | B2 * | 5/2015 | Thorsen | G10L 15/183 704/235 |
| 9,420,227 | B1 * | 8/2016 | Shires | H04N 7/15 |
| 11,095,468 | B1 * | 8/2021 | Pandey | H04L 12/1831 |
| 2008/0101768 | A1 * | 5/2008 | Smith | H04N 5/782 386/E9.037 |
| 2010/0257212 | A1 * | 10/2010 | Polumbus | G06F 16/7844 348/468 |
| 2011/0267419 | A1 * | 11/2011 | Quinn | G06F 3/04842 348/E7.083 |
| 2015/0032448 | A1 * | 1/2015 | Wasserblat | G06F 16/60 704/235 |
| 2015/0208139 | A1 * | 7/2015 | Homyack | H04N 5/445 348/468 |
| 2016/0092088 | A1 * | 3/2016 | Doyle | A63F 13/63 715/738 |
| 2016/0286140 | A1 * | 9/2016 | Ying | H04N 21/4884 |
| 2017/0076713 | A1 * | 3/2017 | Gildein, II | H04N 7/15 |
| 2017/0263265 | A1 * | 9/2017 | Ashikawa | G06F 16/345 |
| 2017/0277784 | A1 * | 9/2017 | Hay | G06F 16/683 |
| 2018/0205797 | A1 * | 7/2018 | Faulkner | H04L 67/14 |

(Continued)

*Primary Examiner* — Thuong Nguyen
(74) *Attorney, Agent, or Firm* — Haley Guiliano LLP

(57) ABSTRACT

Systems and methods are provided herein for providing context to users who access video conferences late. This may be accomplished by a system receiving an audio segment of a video conference and generating a subtitle corresponding to the audio segment. The system may determine a summary relating to the audio segment and then display the subtitle, summary, and video conference on a device. The system allows a user, who accesses a video conference late, to quickly and accurately understand the current video conference discussion, improving the user's experience and increasing the productivity of the video conference.

18 Claims, 16 Drawing Sheets

(56) References Cited

U.S. PATENT DOCUMENTS

| 2021/0065713 A1* | 3/2021 | Degraye | G10L 15/285 |
| 2022/0020388 A1* | 1/2022 | Trim | G10L 25/84 |
| 2022/0207489 A1* | 6/2022 | Gupta | H04N 7/15 |
| 2022/0254348 A1* | 8/2022 | Tay | G10L 15/26 |

* cited by examiner

SYSTEMS AND METHODS FOR ASSOCIATING CONTEXT TO SUBTITLES DURING LIVE EVENTS

BACKGROUND

The present disclosure relates to computer-implemented techniques for video conferencing, in particular to techniques for supplying information related to the video conferencing to a user.

SUMMARY

Whether they are students using video conferencing to join a lecture, fans using video conferencing to join a live event, or employees using video conferencing to join a company meeting, more and more people are using video conferencing on a regular basis. Video conference users sometimes join a scheduled event late (e.g., ten minutes), missing key contextual information. Without the key contextual information, it often takes a user a considerable amount of time to determine what is being discussed in the video conference. For example, a video conference of a lecture may discuss a first subject during the first ten minutes of the lecture then switch to a second subject after the first ten minutes. When a student joins the video conference after the first ten minutes, the student lacks the information regarding the first subject. If, while discussing the second subject, the lecture references similarities to the first subject, the student will not understand what the lecture is referencing because the student missed the information regarding the first subject. In some cases, missing the beginning of a video conference may result in the rest of the video conference being difficult or impossible to understand. This can result in a poor user experience and wasted time. In view of these deficiencies, there exists a need for improved systems and methods for supplying context to users who access video conferences late.

Accordingly, techniques are disclosed herein for improved systems and methods for supplying a user with contextual information regarding video conference discussions that occurred before the user joined the video conference. Once a video conference begins, the video conference application can translate the first received audio (e.g., a first user speaking) into a first subtitle using speech recognition methodologies (e.g., automatic speech recognition, computer speech recognition, speech to text, etc.). The video conference application can process the first subtitle and generate a first summary (e.g., "Introduction," "Recent Updates," etc.) using natural language process algorithms. The video conference application can store the first summary in a database and/or display the first summary along with the video conference. For example, the first summary may be overlaid on the video conference. The video conference application can also translate a second received audio (e.g., a second user speaking) into a second subtitle using methods as described above. Using the natural language process algorithms, the video conference application can determine whether the second subtitle relates to the first summary. If the second subtitle does not relate to the first summary, the video conference application uses the natural language process algorithms to generate a second summary (e.g., "User Two's Question"). The video conference application can store the second summary in the database and/or display the second summary along with the first summary and the video conference. For example, the first and second summary may be overlaid on the video conference. If the second subtitle does relate to the first summary, the video conference application may not generate a second summary and instead display the first summary along with the video conference as described above. The video conference application can continue to generate and/or display summaries along with the video conference as more audio is received.

When a late user joins the video conference, the video conference application can display the summaries (e.g., first summary, second summary, etc.) along with the video conference. The video conference application can also categorize live subtitles to further aid the late user. For example, when the late user joins the video conference, the first thing the late user hears may be a third audio. The video conference application can translate the third received audio into a third subtitle using speech recognition methodologies as described above. The video conference application can process the third subtitle as described above and determine if the third subtitle corresponds to any of the displayed summaries (e.g., first summary, second summary, etc.). If the third subtitle relates to one of the displayed summaries (e.g., the first summary, second summary, etc.), the video conference application may display an indication for the late user. For example, the third subtitle may be tagged with a label (e.g., "S2") relating to the corresponding summary (e.g., second summary). In another example, the third subtitle may be highlighted in the same color as the corresponding summary. Providing a user interface that associates the current discussion with past context allows a user to quickly and accurately understand the current discussion, improving the user's experience and increasing the productivity of the video conference.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1A:
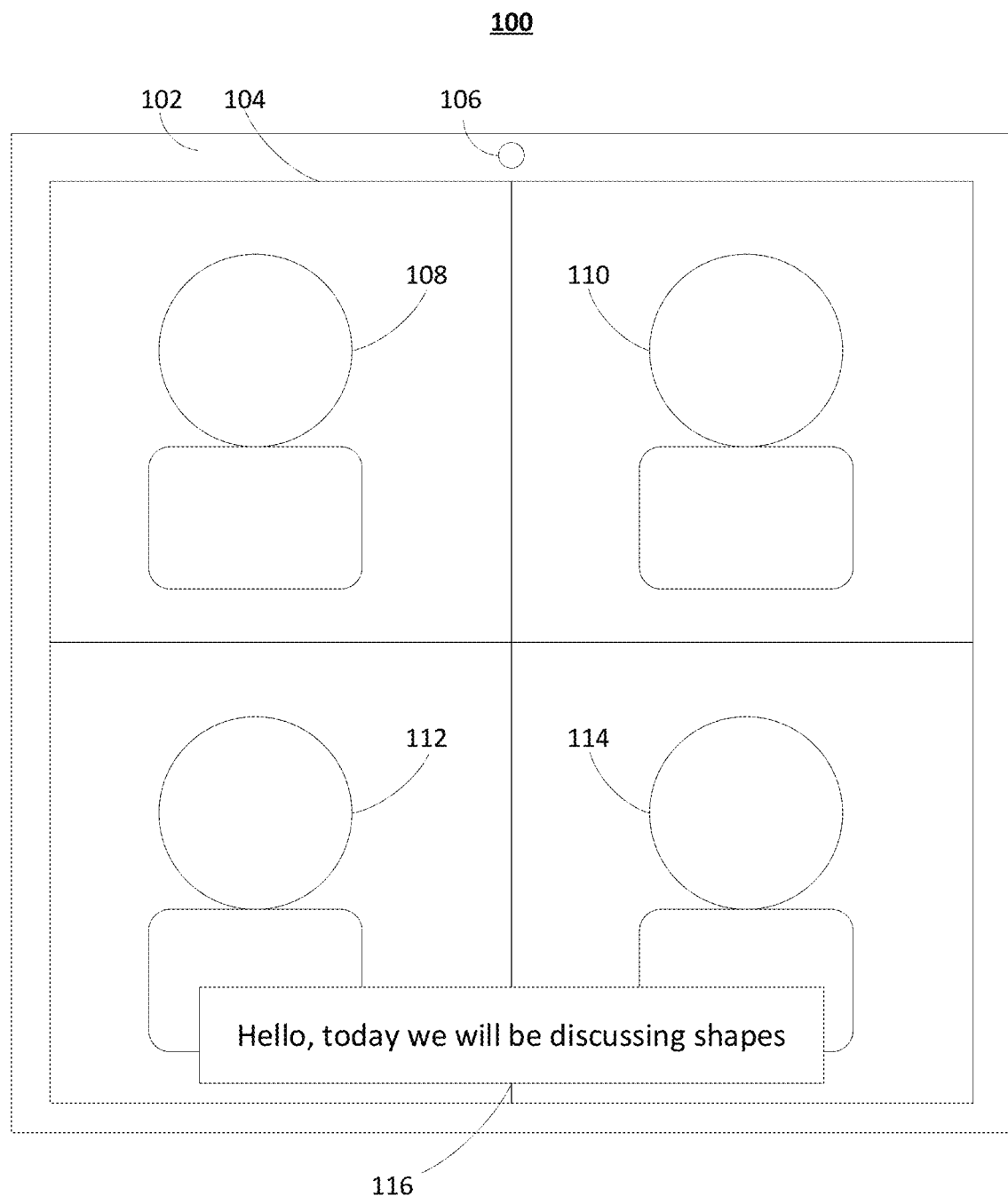
FIGS. 1A-E show illustrative diagrams of a system for providing context to users who access video conferences late, in accordance with some embodiments of the disclosure.

FIGS. 1A-E show illustrative diagrams of a system 100 for providing context to users who access video conferences late, in accordance with some embodiments of the disclosure. System 100 includes a user equipment device 102 with a display 104 and a camera 106. The user equipment device 102 may be any device (e.g., desktop, laptop, smartphone, tablet, etc.) capable of performing video conferencing. In some embodiments, the term "video conferencing" can mean audio and/or video conferencing. In some embodiments, the display 104 displays a user interface for the video conferencing. In some embodiments, the user interface shows a first user 108, a second user 110, a third user 112, and a fourth user 114 separated into four quadrants. Although four quadrants are shown, any number of sections may be used. Further, the sections are not required to be the same size or shape. In some embodiments, a first quadrant displays video data of the first user 108, a second quadrant displays video data of the second user 110, a third quadrant displays video data of the third user 112, and a fourth quadrant displays video data of the fourth user 114. In some embodiments, the displayed video data is captured by the four users' user devices. For example, the first user 108 may use a laptop with a camera to capture and transmit video data, which is displayed in the first quadrant of the displayed user interface. In some embodiments, video data captured by the four users' user devices is not displayed on display 104. For example, a shape, a picture, or similar such placeholder could be displayed by display 104 instead of captured video data. Although four users are shown, any number of users could take part in the described video conference. Further, not all of the users in the video conference need to be shown by the user interface. In some embodiments, only certain users (e.g., users who are speaking and/or have spoken recently, presenters, users transmitting video data, etc.) are displayed. In some embodiments, FIGS. 1A-E represent the point of view of a fifth user joining the video conference at different points during the video conference. For example, the fifth user may see display 104 on user equipment device 102 when the fifth user joins the video conference late.

In some embodiments, a video conference application provides the user interface for the display 104 on the user equipment device 102. In some embodiments, the user equipment device 102 outputs audio data. For example, one or more speakers (not shown) of the user equipment device 102 may output audio related to the video conference. In some embodiments, the audio data is captured by one or more of the user devices of the participants (e.g., the first user 108, the second user 110, the third user 112, and the fourth user 114) of the video conference. For example, the first user 108 may use a laptop with a microphone to capture and transmit audio data which is outputted by the user equipment device 102.

Figure 1B:
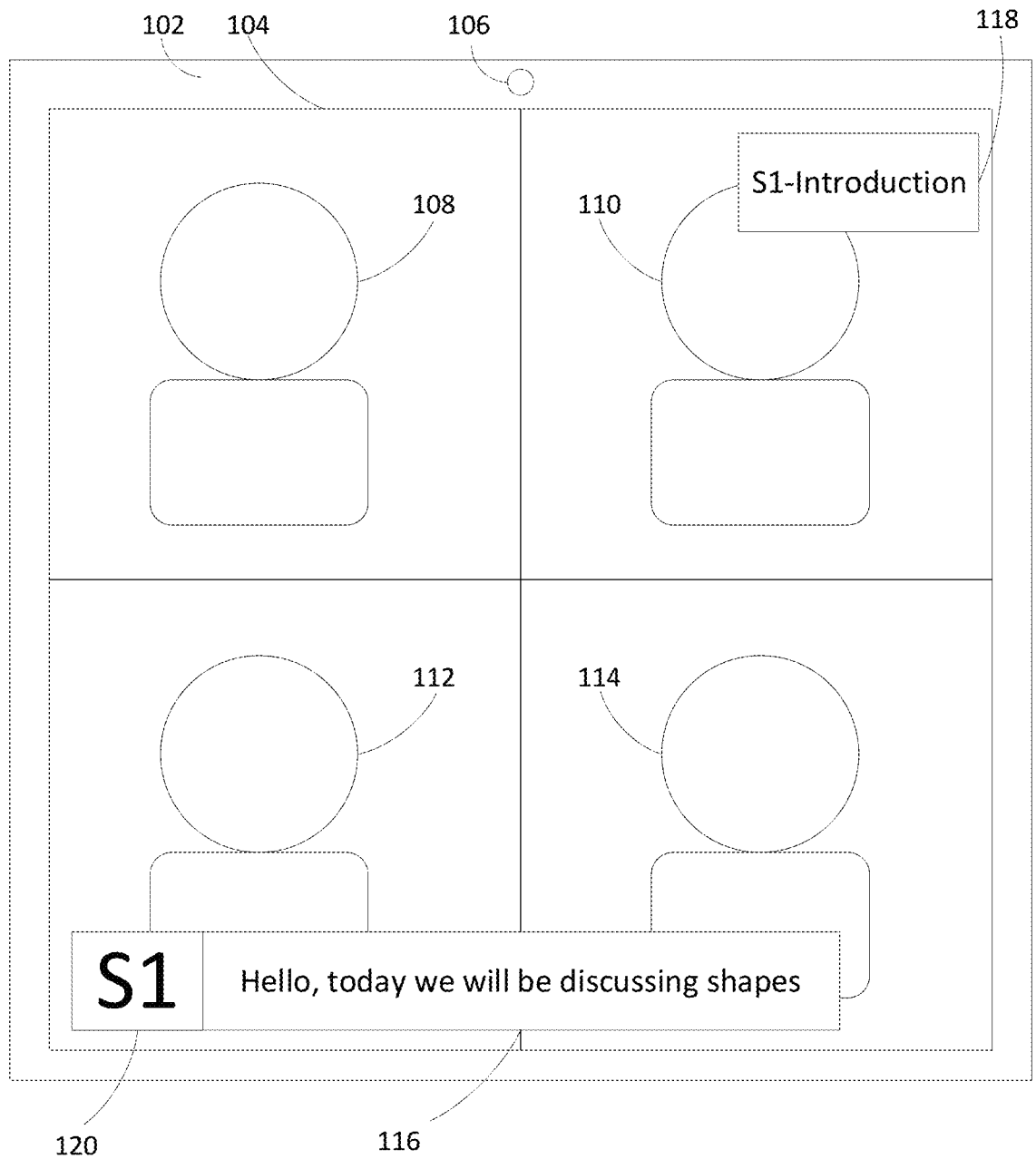

In some embodiments, the user equipment device 102 can translate audio data related to the video conference into a plurality of subtitles. For example, as shown in FIGS. 1A and 1B the user equipment device 102 translates a first audio data received by the first user 108 into a, first subtitle 116. In some embodiments, the translation of audio data into a plurality of subtitles is done in conjunction with a second device (e.g., server). In some embodiments, the translation of audio data into a plurality of subtitles is done using only a second device, and the user equipment device 102 receives the generated subtitles and displays them on display 104. In some embodiments, speech recognition methodologies (e.g., automatic speech recognition, computer speech recognition, speech to text, etc.) are used to translate the audio data into the plurality of subtitles.

In some embodiments, the user equipment device 102 processes one or more subtitles (e.g., first subtitle 116) and generates one or more summaries (e.g., first summary 118) using one or more natural language process algorithms. In some embodiments, the one or more summaries contain one or more words summarizing the one or more subtitles relating to the one or more summaries. In some embodiments, the user equipment device 102 can summarize any number of subtitles. For example, the user equipment device 102 can summarize hundreds of subtitles into a single summary and/or can summarize a single subtitle into a single summary. In some embodiments, the user equipment device 102 uses one or more factors to determine when to generate and/or update a summary. In some embodiments, a factor may indicate that a new summary should be generated based on the user (e.g., first user 108). For example, once the first user 108 stops talking and the second user 110 starts talking, the user equipment device 102 may generate a summary relating to the subtitles generated from the audio data received from the first user 108. In some embodiments, a factor may indicate that a new summary should be generated based on a time frame (e.g., ten seconds, thirty seconds, one minute, ten minutes, etc.). For example, every thirty seconds the user equipment device 102 may generate a summary relating to the subtitles generated during the previous thirty seconds. In some embodiments, a factor may indicate that a new summary should be generated based on the subject matter of the subtitles. For example, whenever the speaker at the video conference concludes speaking about a first subject, the user equipment device 102 may generate a summary relating to the subtitles generated during the discussion of the first subject. In some embodiments, a factor may indicate that a new summary should be generated whenever a user (e.g., user 108) selects a selectable option to generate a new summary. In some embodiments, the one or more factors are weighted to determine when to generate and/or update a summary.

As shown in FIG. 1B, the user equipment device 102 can process the first subtitle 116 and generate a first summary 118 using one or more natural language process algorithms. In some embodiments, the first summary 118 uses one or more words to summarize the first subtitle 116. In some embodiments, the user equipment device 102 displays the first summary 118 along with the video conference. For example, as shown in FIG. 1B, the first summary 118 is overlaid on the video conference. In some embodiments, the user equipment device 102 can store the first summary 118 in a database. In some embodiments, the user equipment device 102 displays one or more indicators to highlight a relationship between one or more subtitles and one or more summaries. For example, as shown in FIG. 1B, the user equipment device 102 displays a first indicator 120 highlighting the relationship between the first subtitle 116 and the first summary 118. Although a text indicator is shown any similar such indicator may be used. For example, the first subtitle 116 may be a similar color, font, size, etc., of the corresponding first summary 118.

Figure 1C:
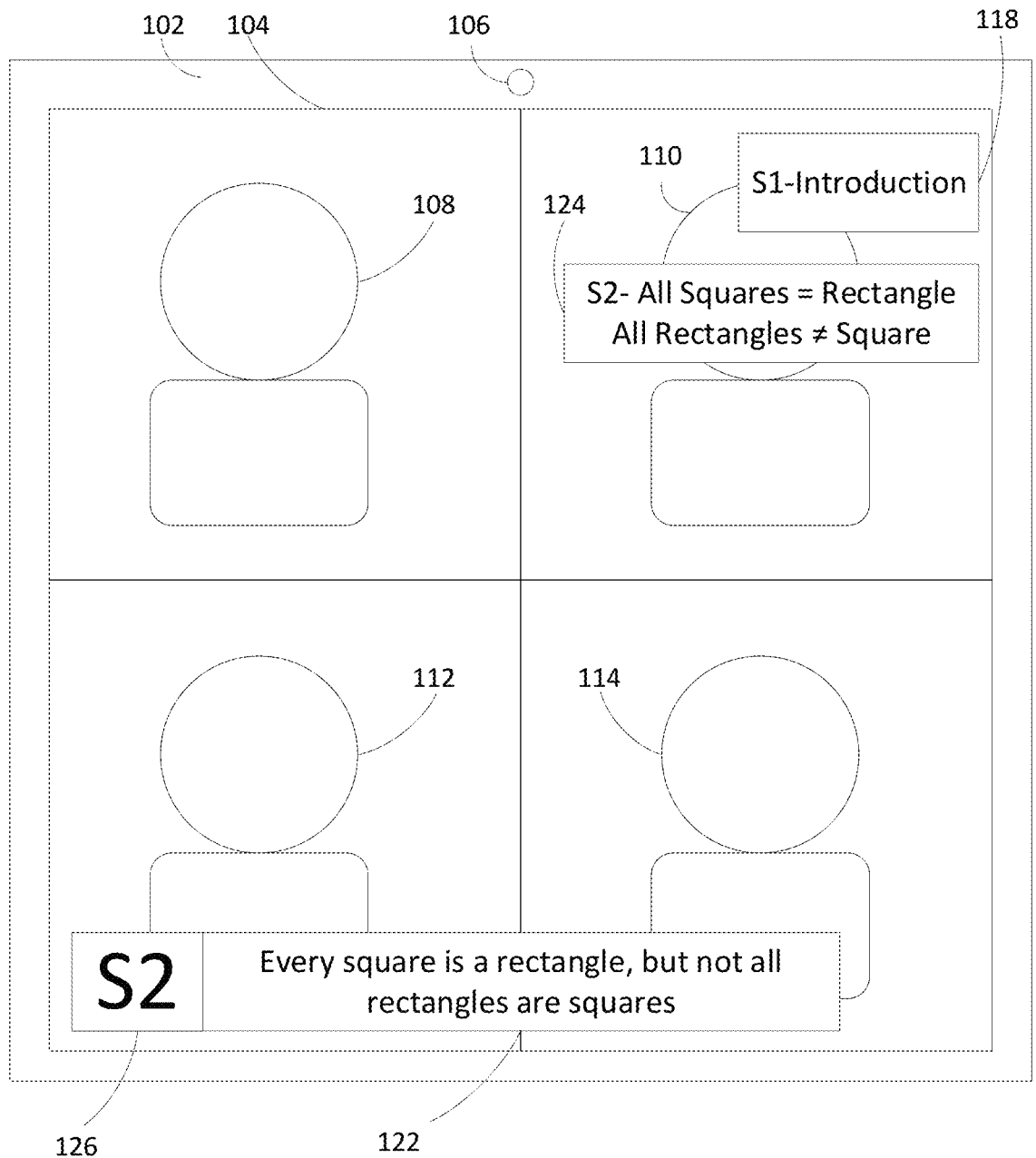

As shown in FIG. 1C, the user equipment device 102 translates a second audio data received by the first user 108 into a second subtitle 122 using one or more of the methodologies described above. In some embodiments, the user equipment device 102 can process the second subtitle 122 and generate a second summary 124 using one or more natural language process algorithms. In some embodiments, the user equipment device 102 displays the first summary 118 and the second summary 124 along with the video conference. For example, as shown in FIG. 1C, the first summary 118 and second summary 124 are overlaid on the video conference. In some embodiments, the user equipment device 102 can store the second summary 124 in a database. As shown in FIG. 1C, the user equipment device 102 displays a second indicator 126 highlighting the relationship between the second subtitle 122 and the second summary 124.

Figure 1D:
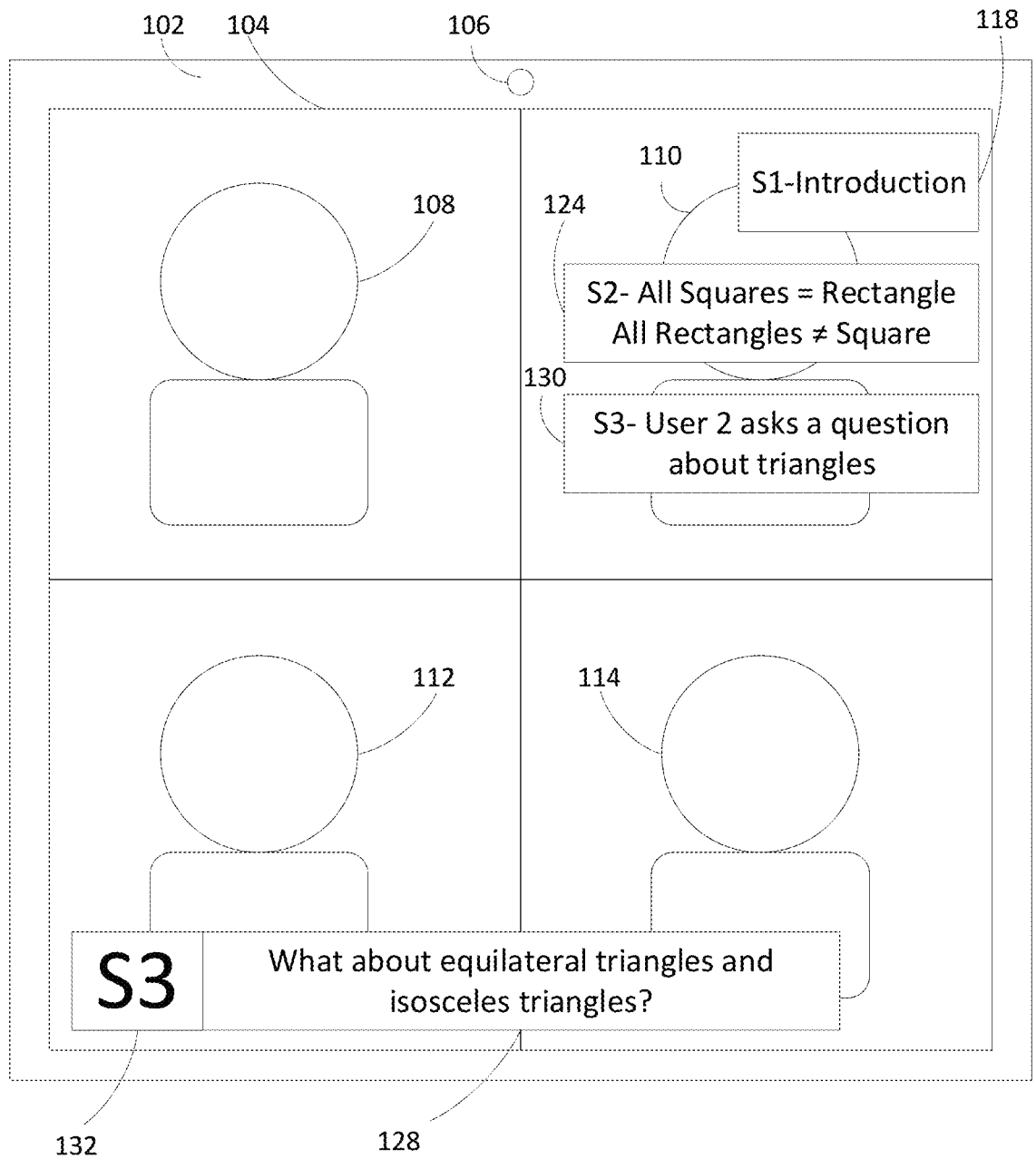

As shown in FIG. 1D, the user equipment device 102 translates a third audio data received by the second user 110 into a third subtitle 128 using one or more of the methodologies described above. In some embodiments, the user equipment device 102 can process the third subtitle 128 and generate a third summary 130 using one or more natural language process algorithms. In some embodiments, the user equipment device 102 displays the first summary 118, the second summary 124, and the third summary 130 along with the video conference. For example, as shown in FIG. 1D, the first summary 118, the second summary 124, and the third summary 130 are overlaid on the video conference. In some embodiments, the user equipment device 102 can store the third summary 130 in a database. As shown in FIG. 1D, the user equipment device 102 displays a third indicator 132 highlighting the relationship between the third subtitle 128 and the third summary 130.

Figure 1E:
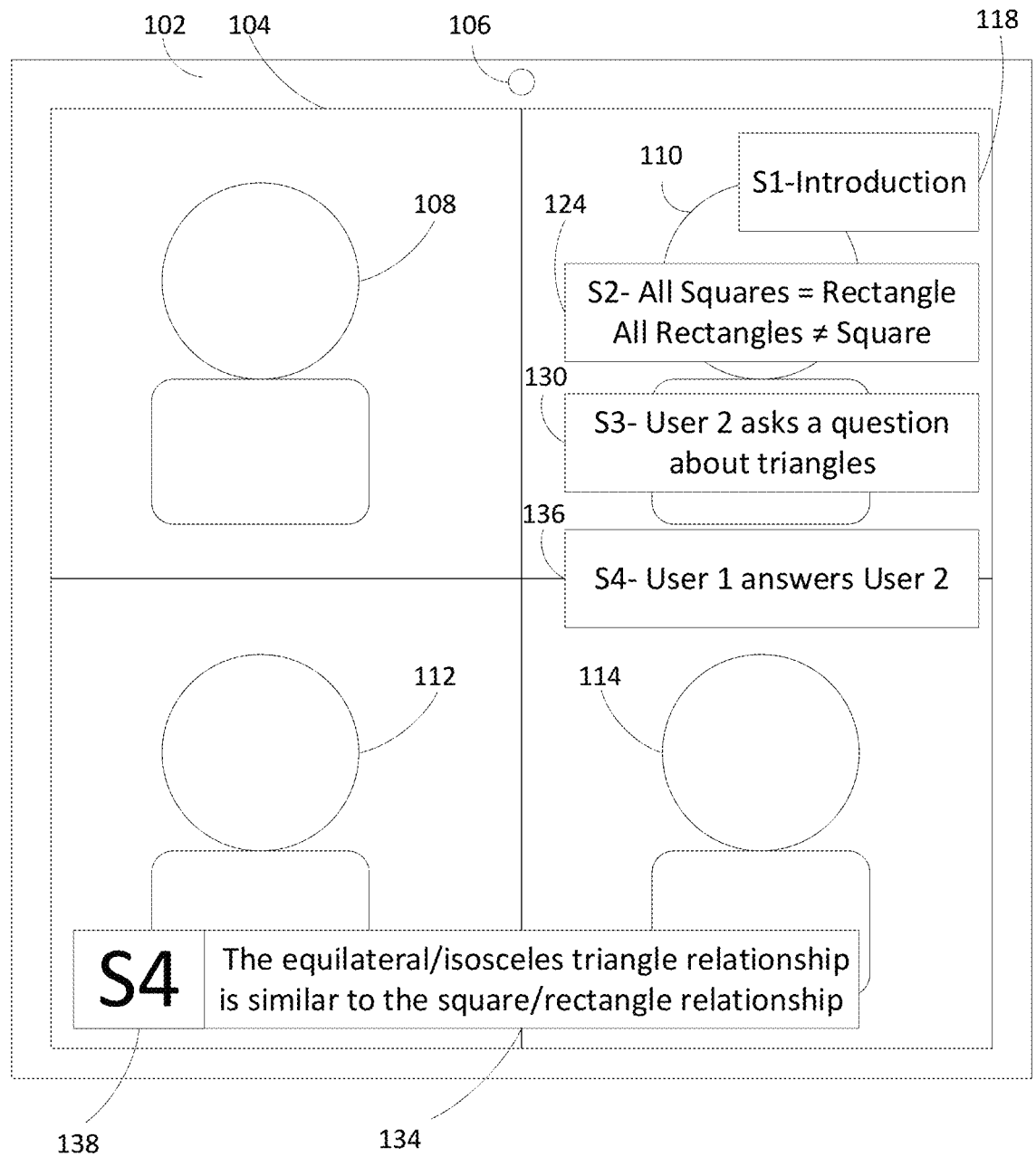

As shown in FIG. 1E, the user equipment device 102 translates a fourth audio data received by the first user 108 into a fourth subtitle 134 using one or more of the methodologies described above. In some embodiments, the user equipment device 102 can process the fourth subtitle 134 and generate a fourth summary 136 using one or more natural language process algorithms. In some embodiments, the user equipment device 102 displays the first summary 118, the second summary 124, the third summary 130, and the fourth summary 136, along with the video conference. For example, as shown in FIG. 1E, the first summary 118, the second summary 124, the third summary 130, and the fourth summary 136 are overlaid on the video conference. In some embodiments, the user equipment device 102 can store the fourth summary 136 in a database. As shown in FIG. 1E, the user equipment device 102 displays a fourth indicator 138 highlighting the relationship between the fourth subtitle 134 and the fourth summary 136. In some embodiments, the user equipment device 102 recognizes that the fourth subtitle 134 also relates to an additional summary (e.g., the second summary 124). In some embodiments, the user equipment device 102 uses one or more natural language process algorithms to determine that that the fourth subtitle 134 relates to an additional summary. In some embodiments, the user equipment device 102 recognizes that one or more words (e.g., square, rectangle, etc.) of the fourth subtitle are similar to and/or the same as one or more words of the second summary 124 and/or the second subtitle 122, which resulted in the second summary 124. In some embodiments, the user equipment device 102 provides additional indicators (e.g., second indicator 126, third indicator 132, etc.) to highlight correlations between the fourth subtitle 134 and previous subtitles and/or summaries (e.g., second summary 124, third summary 130, etc.).

In some embodiments, when a fifth user joins the video conference late, the fifth user is presented with the display 104 of FIG. 1E. In some embodiments, the first thing the fifth user hears is the fourth audio data received by the first user 108. In some embodiments, the fifth user is able to use the displayed interface to quickly and accurately understand the current discussion reflected by the fourth subtitle 134, improving the user's experience and increasing the productivity of the video conference. For example, having access to the second summary 124 allows the fifth user to better understand what the fourth subtitle is referencing when it indicates "square/rectangle relationship," which was a subject that was described earlier (i.e., in FIG. 1C) in the video conference.

Figure 2A:
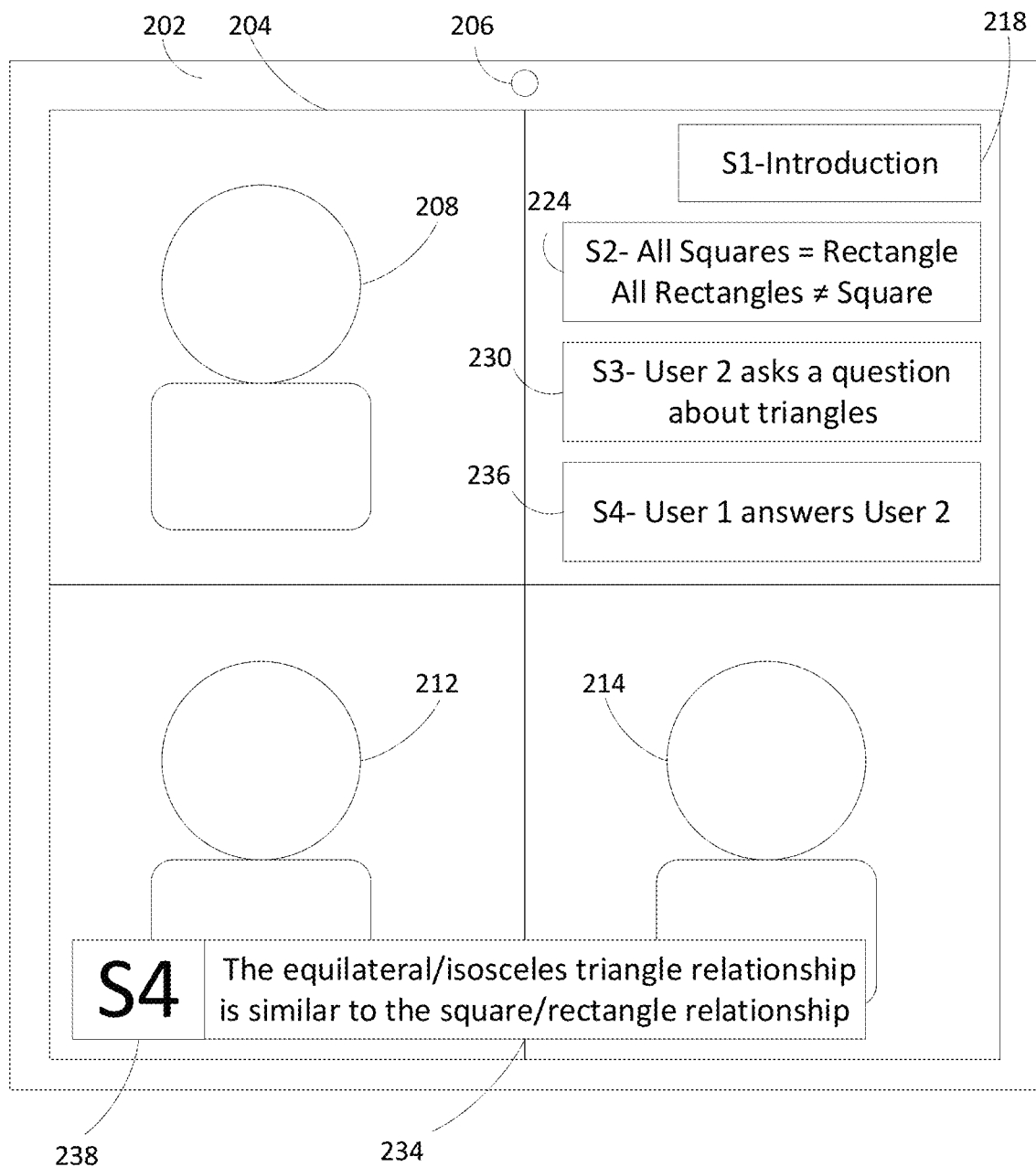
FIGS. 2A-C show additional illustrative diagrams of a system for providing context to users who access video conferences late, in accordance with some embodiments of the disclosure.
Figure 2B:
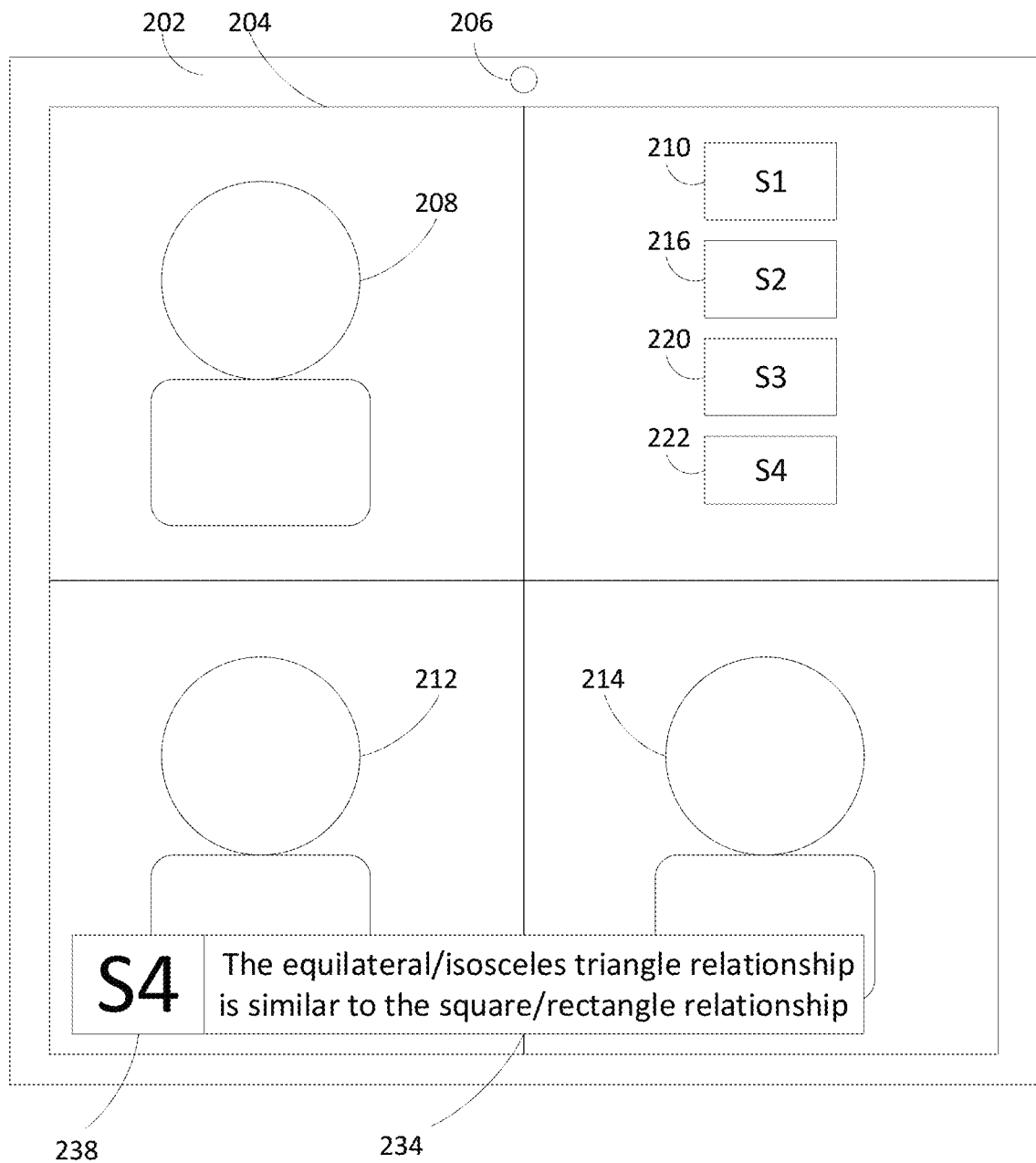
Figure 2C:
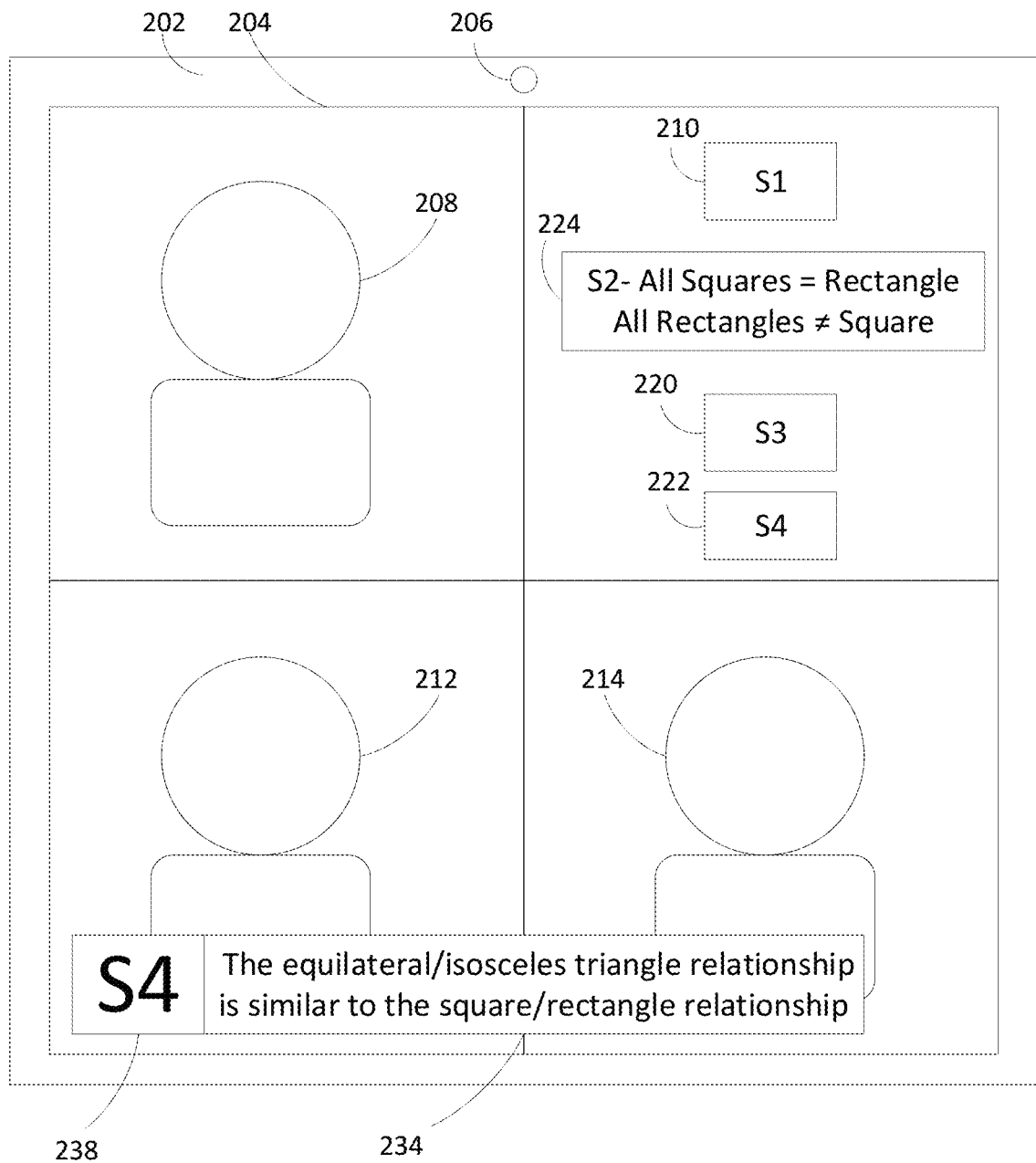

FIGS. 2A-C show additional illustrative diagrams of a system for providing context to users who access video conferences late, in accordance with some embodiments of the disclosure. In some embodiments, FIGS. 2A-C show different user interface embodiments for the system 100 displayed in FIGS. 1A-E.

System 200 includes a user equipment device 202 with a display 204 and a camera 206. The user equipment device 202 may be any device (e.g., desktop, laptop, smartphone, tablet, etc.) capable of performing video conferencing. The display 204 shows a user interface for the video conferencing. In some embodiments, the user interface shows a first user 208 in a first quadrant, a second user 212 in a third quadrant, and a third user 214 in a fourth quadrant. In some embodiments, FIGS. 2A-C represent the point of view of the third user 214 joining the video conference late. In some embodiments, the user interface displays video data of the first user 208 in the first quadrant, the generated summaries (first summary 218, second summary 224, third summary 230, and fourth summary 236) in the second quadrant, video data of the second user 212 in the third quadrant, and displays video data of the third user 214 in the fourth quadrant. As shown, the user equipment device 202 translates audio data received by the first user 208 into a subtitle 234 using one or more of the methodologies described above. In some embodiments, the user equipment device 202 can process the subtitle 234 and generate a fourth summary 236 using one or more natural language process algorithms. In some embodiments, the user equipment device 202 displays an indicator 238 highlighting the relationship between the subtitle 234 and the fourth summary 236.

In some embodiments, the displayed video data is captured by the three users' user devices. For example, when the third user 214 joins late, the user device 202 will capture video data with the camera 206 and transmit video data, which is displayed in quadrant two of the user interface. In some embodiments, video data captured by the users is not displayed on display 204. For example, a shape, a picture, or similar such placeholder could be displayed by display 204 instead of video data captured by the users. Although three users are shown, any number of users could take part in the described video conference. Further, not all of the users in the video conference need to be shown by the user interface. In some embodiments, only certain users (e.g., user who are speaking and/or have spoken recently, presenters, users transmitting video data, etc.) are displayed.

In some embodiments, the user equipment device 202 displays the generated summaries (first summary 218, second summary 224, third summary 230, and fourth summary 236) in the second quadrant. In some embodiments, the user equipment device 202 allows a user (e.g., third user 214) to move the generated summaries to different quadrants. In some embodiments, the user equipment device 202 only displays a threshold number (e.g., five, ten, etc.) of summaries. In some embodiments, the user equipment device 202 only displays the most recent summaries. In some embodiments, the user equipment device 202 uses one or more natural language process algorithms to determine and display the most important summaries. In some embodiments, the user equipment device 202 uses one or more natural language process algorithms to determine and display summaries that are most relevant to the current subtitle 234.

FIG. 2B displays a similar user interface as FIG. 2A, except the generated summaries (first summary 218, second summary 224, third summary 230, and fourth summary 236) are displayed as condensed summaries (first condensed summary 210, second condensed summary 216, third condensed summary 220, and fourth condensed summary 222). In some embodiments, a user (e.g., third user 214) can select a selectable option to change the display 204 from showing generated summaries to condensed summaries. In some embodiments, the indicator 238 highlights which condensed summary corresponds to the current subtitle 234.

FIG. 2C displays a user interface similar to those in FIGS. 2A and 2B. In some embodiments, a user (e.g., third user 214) can select one or more of the condensed summaries (e.g., second condensed summary 216) and the user equipment device 204 changes the condensed summary into the corresponding generated summary (e.g., second summary 224). In some embodiments, the user equipment device 202 automatically changes one or more condensed summaries into their corresponding generated summaries based on the most recent generated summaries. In some embodiments, the user equipment device 202 automatically changes one or more condensed summaries into their corresponding generated summaries based on the most important summaries. In some embodiments, the user equipment device 202 automatically changes one or more condensed summaries into their corresponding generated summaries that are most relevant to the current subtitle 234.

Figure 3A:
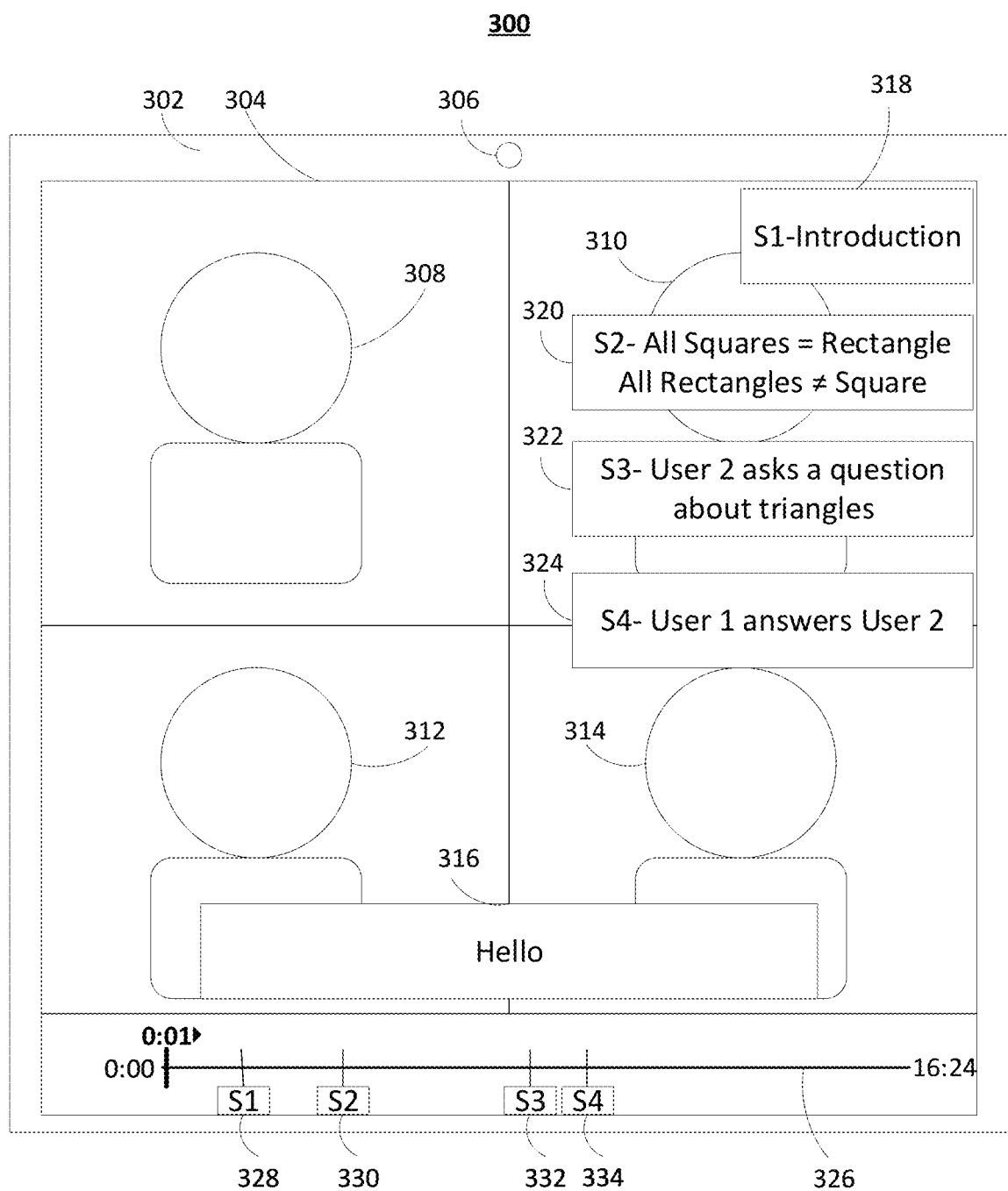
FIGS. 3A and 3B show illustrative diagrams of a system for providing context to users who access a recording, in accordance with some embodiments of the disclosure.
Figure 3B:
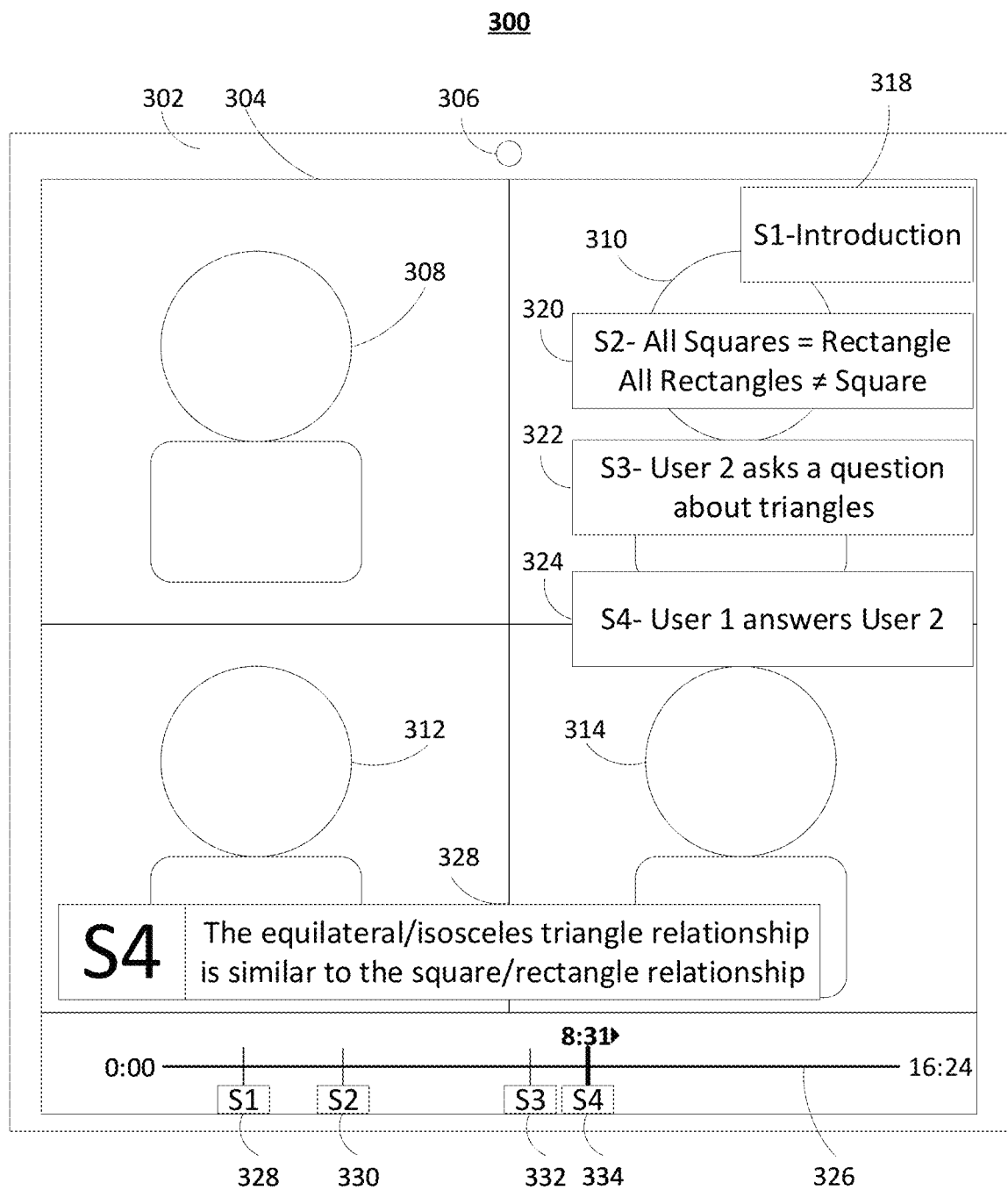

FIGS. 3A and 3B show illustrative diagrams of a system for providing context to users who access a recording, in accordance with some embodiments of the disclosure. In some embodiments, FIGS. 3A and 3B show a video recording of the video conference described in relation to FIGS. 1A-2C. In some embodiments, the video conference is recorded by one or more user equipment devices (e.g., user equipment device 202) used in the video conference. In some embodiments, the video conference is recorded by a server or similar device.

System 300 includes a user equipment device 302 with a display 304 and a camera 306. The user equipment device 302 may be any device (e.g., desktop, laptop, smartphone, tablet, etc.) capable of viewing recordings. The display 304 displays a user interface for the video conference recordings. In some embodiments, the user interface shows a first user 308 in a first quadrant, a second user 310 in a second quadrant, a third user 312 in a third quadrant, and fourth user 314 a fourth quadrant. In some embodiments, the displayed user interface is the same or similar to the user interface displayed during the video conference that was recorded.

In some embodiments, the user equipment device 302 translates the audio data of the recorded video conference into one or more subtitles (e.g., subtitle 316) using one or more of the methodologies described above. In some embodiments, display 304 also shows a first summary 318, a second summary 320, a third summary 322, and a fourth summary 324. In some embodiments, the generated summaries (the first summary 318, the second summary 320, the third summary 322, and the fourth summary 324) are generated during the recorded video conference using the methodologies described above. In some embodiments, the generated summaries are generated after the conclusion of the video conference. For example, the generated summaries can be generated to facilitate more efficient viewing of the recording of the video conference. In some embodiments, the user equipment device 302 processes the one or more subtitles (e.g., subtitle 316) and generates the generated summaries using one or more natural language process algorithms.

In some embodiments, system 300 also comprises a play bar 326. The play bar 326 can indicate the total amount of time of the recording of the video conference and/or the point of time that the display 304 is showing. In some embodiments, the play bar 326 further comprises a first playback indicator 328 corresponding to the time during the recording of the video conference associated with the first generated summary 318. In some embodiments, the play bar 326 further comprises a second playback indicator 330 corresponding to the time during the recording of the video conference associated with the second generated summary 320. In some embodiments, the play bar 326 further comprises a third playback indicator 332 corresponding to the time during the recording of the video conference associated with the third generated summary 322. In some embodiments, the play bar 326 further comprises a fourth playback indicator 334 corresponding to the time during the recording of the video conference associated with the fourth generated summary 324. In some embodiments, the playback indicators (e.g., first playback indicator 328) indicate the beginning of a portion of the recorded video conference that relates to the respective generated summary (e.g., first generated summary 318). In some embodiments, the playback indicators indicate every portion of the recorded video conference that relates to the respective generated summary. In some embodiments, the playback indicators indicate one or more of the most relevant portions of the recorded video conference that relates to the respective generated summary.

In some embodiments, the playback indicators (first playback indicator 328, second playback indicator 330, third playback indicator 332, and fourth playback indicator 334) are selectable. In some embodiments, when a user selects a playback indicator the corresponding portion of the recorded video conference will play. For example, FIG. 3B illustrates an embodiment where the user selects the fourth playback indicator 334. In some embodiments, when the fourth playback indicator 334 is selected, the user equipment device 302 begins playback starting at the portion of the recorded video conference corresponding to the fourth playback indicator 334. In some embodiments, the generated summaries (the first summary 318, the second summary 320, the third summary 322, and the fourth summary 324) are selectable. In some embodiments, when a user selects a generated summary, the corresponding portion of the recorded video conference will play. In some embodiments, if the user selects the fourth summary 324, the user equipment device 302 begins playback starting at the portion of the recorded video conference corresponding to the fourth summary 324.

Figure 4:
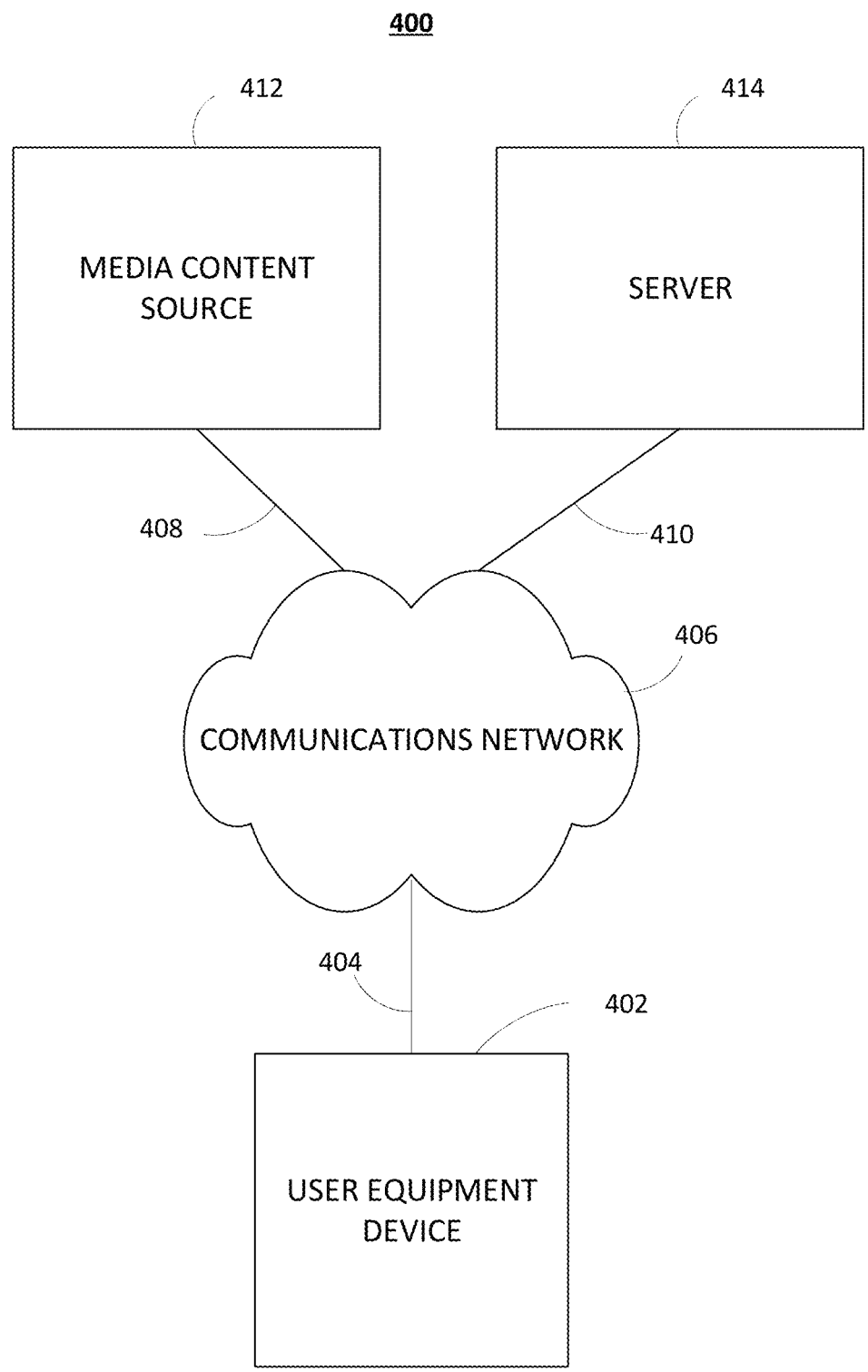
FIG. 4 shows an illustrative block diagram of a system for supplying context to users who access a video conference late, in accordance with some embodiments of the disclosure.
Figure 5:
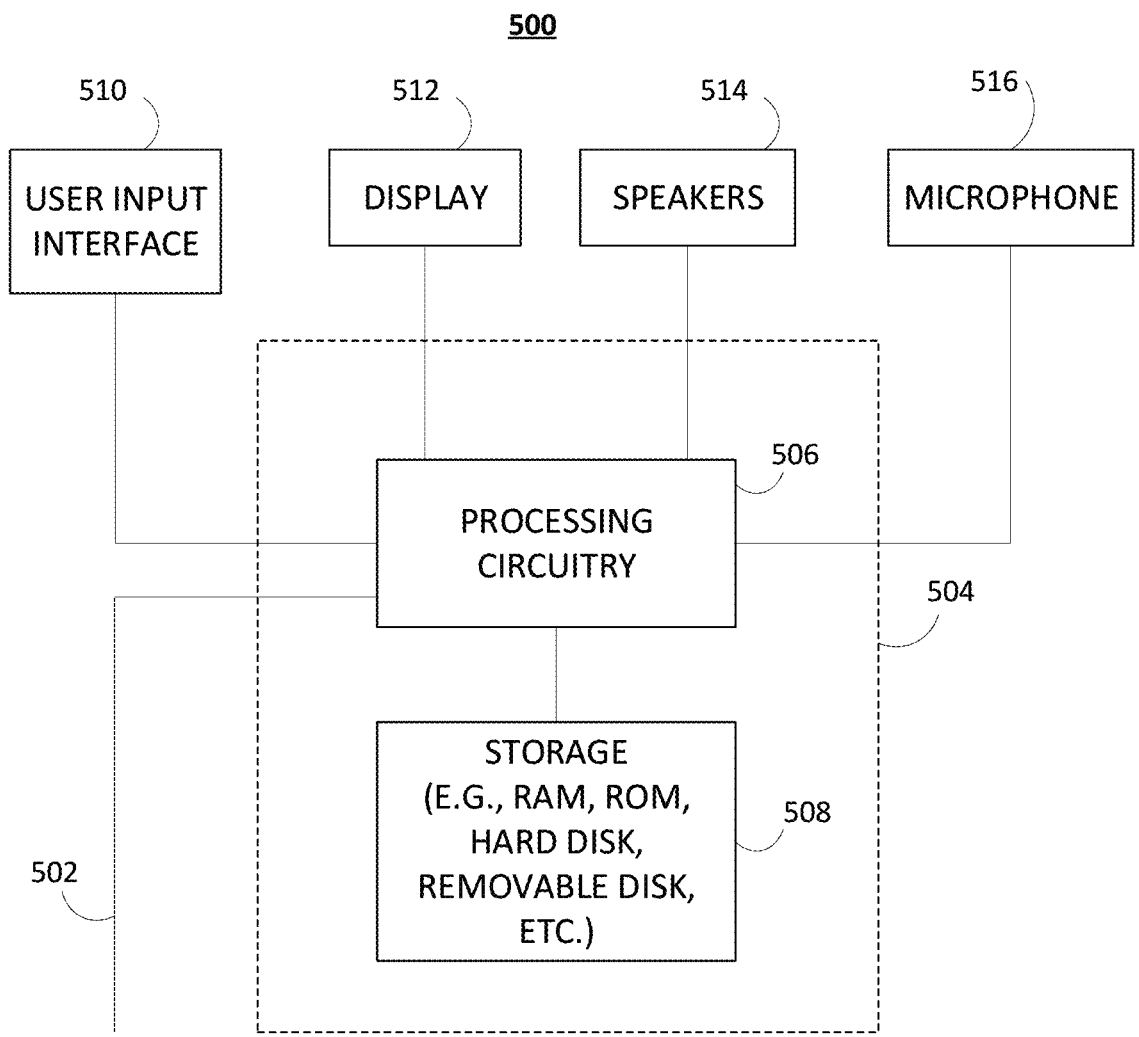
FIG. 5 shows an illustrative block diagram of a user equipment (UE) device system, in accordance with some embodiments of the disclosure.

FIGS. 4-5 describe exemplary devices, systems, servers, and related hardware for providing context to users who access a video conference late, in accordance with some embodiments. In the system 400, there can be more than one user equipment device 402 but only one is shown in FIG. 4 to avoid overcomplicating the drawing. In addition, a user may utilize more than one type of user equipment device and more than one of each type of user equipment device. In an embodiment there may be paths between user equipment devices, so that the devices may communicate directly with each other via communications paths, as well as other short-range point-to-point communications paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. In an embodiment, the user equipment devices may also communicate with each other directly through an indirect path via the communications network 406.

The user equipment devices may be coupled to communications network 406. Namely, the user equipment device 402 is coupled to the communications network 406 via communications path 404. The communications network 406 may be one or more networks including the Internet, a mobile phone network, mobile voice or data network (e.g., a 4G, 5G, or LTE network), cable network, public switched telephone network, or other types of communications network or combinations of communications networks. The path 404 may separately or in together with other paths include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. In one embodiment path 404 can be a wireless path. Communication with the user equipment device may be provided by one or more communications paths but is shown as a single path in FIG. 4 to avoid overcomplicating the drawing.

The system 400 also includes media content source 412, and server 414, which can be coupled to any number of databases providing information to the user equipment devices. The media content source 412 represents any computer-accessible source of content, such as a storage for audio content, metadata, or similar such information. The server 314 may store and execute various software modules for implementing the providing of context to users who access a video conference late functionality. In some embodiments, the user equipment device 302, media content source 312, and server 314 may store metadata associated with a media asset.

FIG. 5 shows a generalized embodiment of a user equipment device 500, in accordance with one embodiment. In an embodiment, the user equipment device 500, is the same user equipment device 402 of FIG. 4. The user equipment device 500 may receive content and data via input/output (I/O) path 502. The I/O path 502 may provide audio content (e.g., broadcast programming, on-demand programming, Internet content, content available over a local area network (LAN) or wide area network (WAN), and/or other content) and data to control circuitry 504, which includes processing circuitry 506 and a storage 508. The control circuitry 504 may be used to send and receive commands, requests, and other suitable data using the I/O path 502. The I/O path 502 may connect the control circuitry 504 (and specifically the processing circuitry 506) to one or more communications paths. I/O functions may be provided by one or more of these communications paths but are shown as a single path in FIG. 5 to avoid overcomplicating the drawing.

The control circuitry 504 may be based on any suitable processing circuitry such as the processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). The providing of context to users who access a video conference late functionality can be at least partially implemented using the control circuitry 504. The providing of context to users who access a video conference late functionality described herein may be implemented in or supported by any suitable software, hardware, or combination thereof. The providing of context to users who access a video conference late functionality can be implemented on user equipment, on remote servers, or across both.

In client-server-based embodiments, the control circuitry 504 may include communications circuitry suitable for communicating with one or more servers that may at least implement the described providing of context to users who access a video conference late. The instructions for carrying out the above-mentioned functionality may be stored on the one or more servers. Communications circuitry may include a cable modem, an integrated service digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device provided as the storage 508 that is part of the control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid-state devices, quantum storage devices, gaming consoles, gaming media, or any other suitable fixed or removable storage devices, and/or any combination of the same. The storage 508 may be used to store various types of content described herein. Nonvolatile memory may also be used (e.g., to launch a boot-up routine and other instructions). Cloud-based storage, described in relation to FIG. 4, may be used to supplement the storage 508 or instead of the storage 508.

The control circuitry 504 may include audio generating circuitry and tuning circuitry, such as one or more analog tuners, audio generation circuitry, filters or any other suitable tuning or audio circuits or combinations of such circuits. The control circuitry 504 may also include scaler circuitry for upconverting and down converting content into the preferred output format of the user equipment device 500. The control circuitry 504 may also include digital-to-analog converter circuitry and analog-to-digital converter circuitry for converting between digital and analog signals. The tuning and encoding circuitry may be used by the user equipment device 500 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 508 is provided as a separate device from the user equipment device 500, the tuning and encoding circuitry (including multiple tuners) may be associated with the storage 508.

The user may utter instructions to the control circuitry 504, which are received by the microphone 516. The microphone 516 may be any microphone (or microphones) capable of detecting human speech. The microphone 516 is connected to the processing circuitry 506 to transmit detected voice commands and other speech thereto for processing. In some embodiments, voice assistants (e.g., Siri, Alexa, Google Home and similar such voice assistants) receive and process the voice commands and other speech.

The user equipment device 500 may optionally include an interface 510. The interface 510 may be any suitable user interface, such as a remote control, mouse, trackball, keypad, keyboard, touch screen, touchpad, stylus input, joystick, or other user input interfaces. A display 512 may be provided as a stand-alone device or integrated with other elements of the user equipment device 500. For example, the display 512 may be a touchscreen or touch-sensitive display. In such circumstances, the interface 510 may be integrated with or combined with the microphone 516. When the interface 510 is configured with a screen, such a screen may be one or more of a monitor, a television, a liquid crystal display (LCD) for a mobile device, active matrix display, cathode ray tube display, light-emitting diode display, organic light-emitting diode display, quantum dot display, or any other suitable equipment for displaying visual images. In some embodiments, the interface 510 may be HDTV-capable. In some embodiments, the display 512 may be a 3D display. The speaker (or speakers) 514 may be provided as integrated with other elements of user equipment device 500 or may be a stand-alone unit. In some embodiments, the display 512 may be outputted through speaker 514.

The user equipment device 500 of FIG. 5 can be implemented in system 400 of FIG. 4 as user equipment device 402, but any other type of user equipment suitable for providing context to users who access a video conference late may be used. For example, user equipment devices such as television equipment, computer equipment, wireless communication devices, or similar such devices may be used. User equipment devices may be part of a network of devices. Various network configurations of devices may be implemented and are discussed in more detail below.

Figure 6:
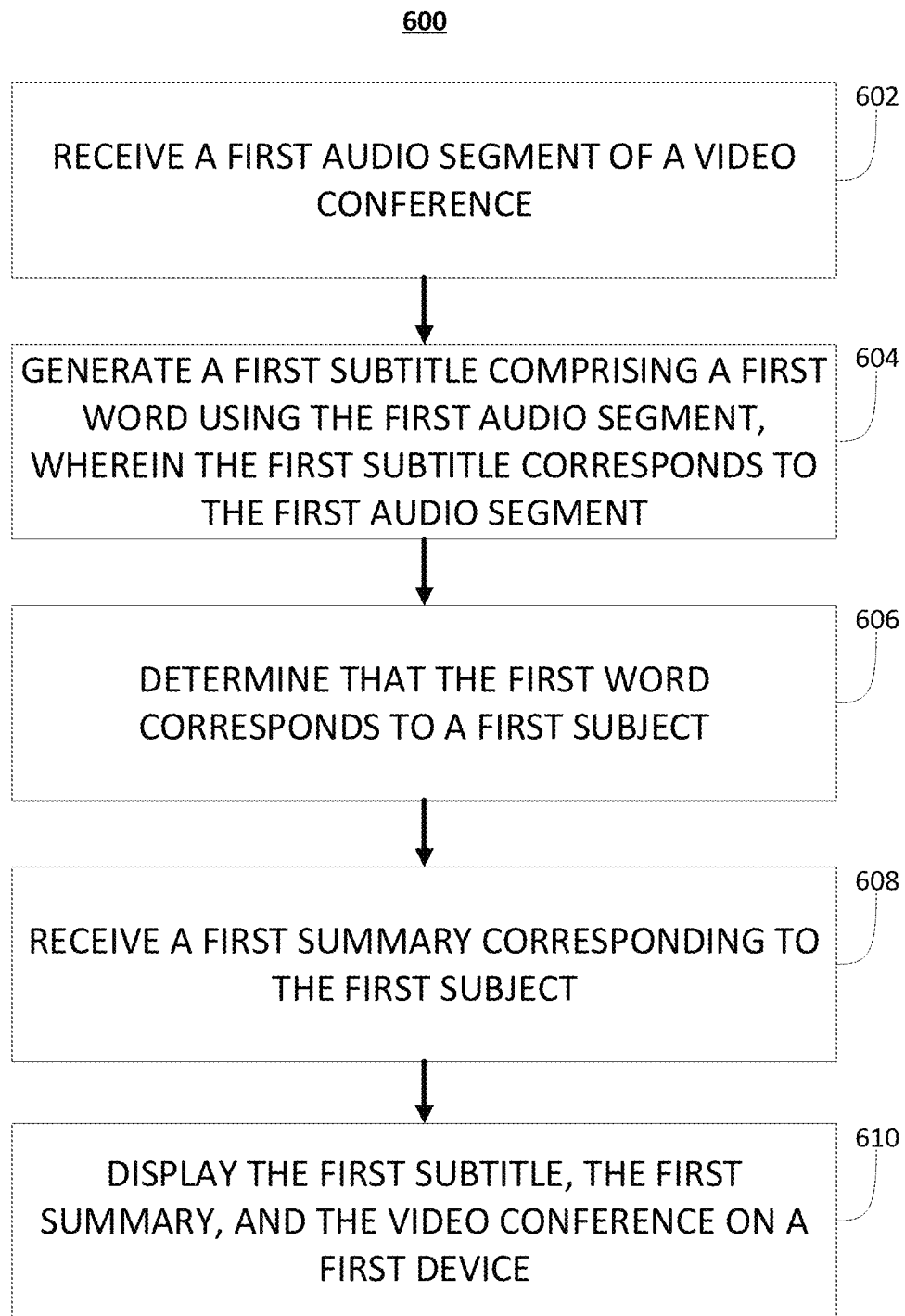
FIG. 6 is an illustrative flowchart of a process for supplying context to users who access video conferences late, in accordance with some embodiments of the disclosure.

FIG. 6 is an illustrative flowchart of a process 600 for providing context to users who access a video conference late, in accordance with some embodiments of the disclosure. Process 600, and any of the following processes, may be executed by control circuitry 504 on a user equipment device 500. In some embodiments, control circuitry 504 may be part of a remote server separated from the user equipment device 500 by way of a communications network or distributed over a combination of both. In some embodiments, instructions for executing process 600 may be encoded onto a non-transitory storage medium (e.g., the storage 508) as a set of instructions to be decoded and executed by processing circuitry (e.g., the processing circuitry 506). Processing circuitry may, in turn, provide instructions to other sub-circuits contained within control circuitry 504, such as the encoding, decoding, encrypting, decrypting, scaling, analog/digital conversion circuitry, and the like. It should be noted that any of the process, or any step thereof, could be performed on, or provided by, any of the devices shown in FIGS. 1-5. Although the processes are illustrated and described as a sequence of steps, it is contemplated that various embodiments of the processes may be performed in any order or combination and need not include all the illustrated steps.

At 602, the user equipment device 500, by control circuitry 504, receives a first audio segment of a video conference. In some embodiments, the user equipment device 500 receives the first audio segment using a microphone (e.g., microphone 516). In some embodiments, the user equipment device 500 receives the first audio segment from a second user equipment device, server, and/or similar such device. In some embodiments, the first audio segment is one or more sounds. In some embodiments, the first audio segment is one or more words. In some embodiments, the first audio segment comprises audio data transmitted during the video conference. In some embodiments, the first audio segment comprises audio data recorded during the video conference.

At 604, the user equipment device 500, by control circuitry 504, generates a first subtitle comprising a first word using the first audio segment, wherein the first subtitle corresponds to the first audio segment. In some embodiments, the generation of the first subtitle is done in conjunction with a second user equipment device, server, and/or similar such device. In some embodiments, the generation of the first subtitle is done using only a second device, and the user equipment device 500 receives the first generated subtitle and the first audio segment. In some embodiments, one or more speech recognition methodologies (e.g., automatic speech recognition, computer speech recognition, speech to text, etc.) are used to translate the first audio segment into the first subtitle.

At 606, the user equipment device 500, by control circuitry 504, determines that the first word corresponds to a first subject. In some embodiments, the first word and the first subject may be the same or similar. For example, the first word may be "rectangle" and the first subject may be "rectangles." In some embodiments, the first word is only associated with the first subject. For example, the first word may be "rectangle" and the first subject may be "shapes." In some embodiments, the first subject may be one word or many words. For example, the first subject may be "relationships that exist between squares and rectangles." In some embodiments, the user equipment device 500 uses one or more natural language process algorithms to determine that the first word corresponds to the first subject. In some embodiments, the user equipment device 500 has access to a database of one or more subjects. In some embodiments, the user equipment device 500 compares the first word to the one or more subjects in the database to determine if the first word corresponds to the one or more subjects. In some embodiments, the user equipment device 500 determines that the first word corresponds to more than one subject. In some embodiments, the user equipment device 500 selects one subject of the subjects that corresponds to the first word. In some embodiments, the user equipment device 500 determines that none of the one or more subjects corresponds to the first word and generates a new subject corresponding to the first word. In some embodiments, the user equipment device 500 uses more than the first word to determine the first subject. For example, the first world may be "rectangle" and a second world may be "square," the user equipment device 500 can determine that the first subject (e.g., "relationship between squares and rectangles") is more closely related to the first word than a second subject (e.g., "shapes").

At 608, the user equipment device 500, by control circuitry 504, receives a first summary corresponding to the first subject. In some embodiments, the user equipment device 500 has access to a database with a plurality of entries linking a plurality of subjects to a plurality of summaries. In some embodiments, the database with a plurality of entries is the same database described in step 606. In some embodiments, more than one subject can correspond to the first summary. In some embodiments, more than one summary can correspond to the same subject. In some embodiments, the user equipment device 500 generates the first summary using one or more natural language process algorithms. In some embodiments, the user equipment device 500 updates the first summary based on the first word and/or first subtitle. For example, if the first summary was "rectangles and squares are related" and the first subtitle was "every square is a rectangle, but not all rectangles are squares" the user equipment device 500 can update the first summary to be "all squares=rectangle but all rectangles square." In some embodiments, the first summary comprises one or more words and/or symbols summarizing the first word and/or first subtitle. In some embodiments, the first summary comprises one or more words summarizing all the words and/or subtitles that relate to the first summary. In some embodiments, the first summary corresponds to any number of words and/or subtitles. For example, the user equipment device 500 can summarize hundreds of subtitles into the first summary and/or can summarize only the first word into the first summary.

In some embodiments, the user equipment device 500 uses one or more factors to determine when to generate and/or to update the first summary. In some embodiments, a factor may indicate that the first summary should be generated based on the type of audio segment. For example, once a first user stops talking and a second user starts talking, the user equipment device 500 may generate the first summary relating to subtitles generated from the audio segment of the first user. In some embodiments, a factor may indicate that the first summary should be generated based on a time frame (e.g., ten seconds, thirty seconds, one minute, ten minutes, etc.). For example, after thirty seconds the user equipment device 500 may generate the first summary relating to the first word, first subtitle, and/or other subtitles generated during the thirty seconds. In some embodiments, a factor may indicate that the first summary should be generated based on the subject matter of the discussion. For example, whenever a speaker on the video conference concludes speaking about a subject (e.g., first subject), the user equipment device 500 may generate a summary (e.g., first summary) relating to the first word, first subtitle, or other subtitles generated during the discussion of the subject. In some embodiments, a factor may indicate that the first summary should be generated whenever a user (e.g., user 108) selects a selectable option to generate the first summary. In some embodiments, the one or more factors are weighted to determine when to generate and/or to update the first summary.

At 610, the user equipment device 500, by control circuitry 504, displays the first subtitle, the first summary, and the video conference. In some embodiments, the first subtitle and/or the first summary may be overlaid on the video conference data. In some embodiments, the display resembles the displays shown in FIGS. 1A-3B.

Figure 7:
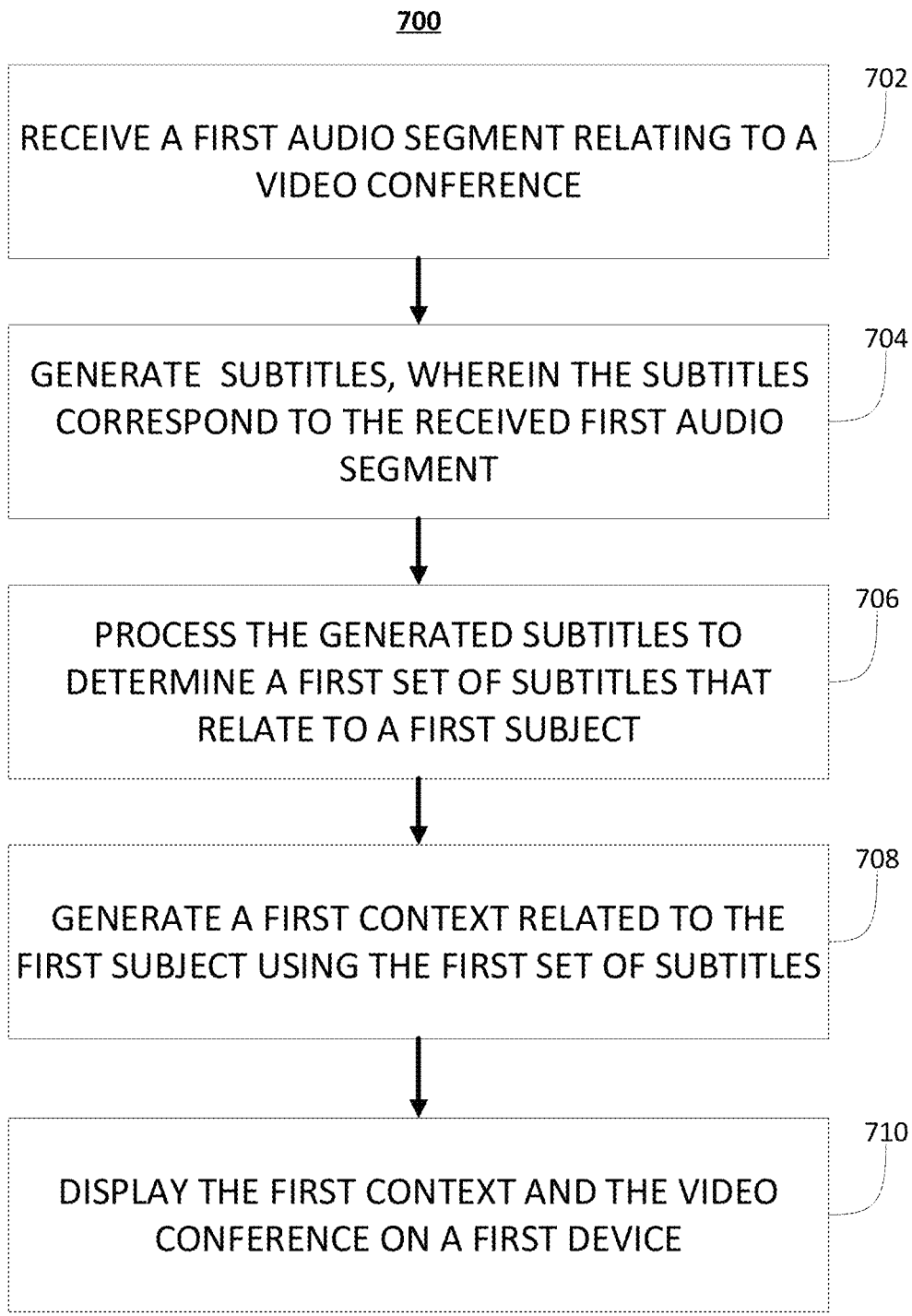
FIG. 7 is another illustrative flowchart of a process for supplying context to users who access video conferences late, in accordance with some embodiments of the disclosure.

FIG. 7 is another illustrative flowchart of a process 700 for providing context to users who access a video conference late, in accordance with some embodiments of the disclosure.

At 702, the user equipment device 500, by control circuitry 504, receives a first audio segment relating to a video conference. In some embodiments, the user equipment device 500 receives the first audio segment using a microphone (e.g., microphone 516). In some embodiments, the user equipment device 500 receives the first audio segment from a second user equipment device, server, and/or similar such device. In some embodiments, the first audio segment is one or more sounds. In some embodiments, the first audio segment is one or more words. In some embodiments, the first audio segment comprises audio data recorded during the video conference. In some embodiments, the first audio segment comprises audio data transmitted during the video conference.

At 704, the user equipment device 500, by control circuitry 504, generates subtitles, wherein the subtitles correspond to the first audio segment. In some embodiments, the generation of the subtitles is done in conjunction with a second user equipment device, server, and/or similar such device. In some embodiments, the generation of the subtitles is done using only a second device, and the user equipment device 500 receives the generated subtitles and the first audio segment. In some embodiments, one or more speech recognition methodologies (e.g., automatic speech recognition, computer speech recognition, speech to text, etc.) are used to translate the first audio segment into the generated subtitles.

At 706, the user equipment device 500, by control circuitry 504, processes the generated subtitles to determine a first set of subtitles that relate to a first subject. In some embodiments, the user equipment device 500 uses one or more natural language process algorithms to group the first set of subtitles. In some embodiments, the user equipment device 500 groups the first set of subtitles because the first set of subtitles relates to a first subject. In some embodiments, the user equipment device 500 also groups a second set of subtitles. In some embodiments, the user equipment device 500 groups all of the subtitles of the generated subtitles into sets. In some embodiments, some of the generated subtitles may be grouped in one set, multiple sets, or no sets.

In some embodiments, one or more words of the first set of subtitles and the first subject may be the same or similar. For example, the one or more words of the first set of subtitles may be "rectangle" and the first subject may be "rectangles." In some embodiments, the one or more words of the first set of subtitles are only associated with the first subject. For example, the one or more words of the first set of subtitles may be "rectangle," and the first subject may be "shapes." In some embodiments, the first subject may be one word or many words. For example, the first subject may be "relationships that exist between squares and rectangles." In some embodiments, the user equipment device 500 has access to a database of one or more subjects. In some embodiments, the user equipment device 500 compares the first set of subtitles to the one or more subjects in the database to determine if the first set of subtitles corresponds to the one or more subjects. In some embodiments, the user equipment device 500 determines that the first set of subtitles corresponds to more than one subject. In some embodiments, the user equipment device 500 selects one subject of the one or more subjects that corresponds to the first set of subtitles. In some embodiments, the user equipment device 500 determines that none of the one or more subjects corresponds to the first set of subtitles and generates a new subject corresponding to the first set of subtitles.

At 708, the user equipment device 500, by control circuitry 504, generates a first context related to the first subject using the first set of subtitles. In some embodiments, the first context is a summary. In some embodiments, the user equipment device 500 has access to a database with a plurality of entries linking a plurality of subjects to a plurality of contexts. In some embodiments, the database with a plurality of entries is the same database described in step 706. In some embodiments, more than one context can correspond to the first context. In some embodiments, more than one context can correspond to the same subject. In some embodiments, the user equipment device 500 generates the first context using one or more natural language process algorithms. In some embodiments, the user equipment device 500 updates the first context based on the first set of subtitles. For example, if the first context was "rectangles and squares are related" and the first set of subtitles comprised the statement "every square is a rectangle, but not all rectangles are squares," the user equipment device 500 can update the first context to be "all squares=rectangle but all rectangles square." In some embodiments, the first context comprises one or more words and/or symbols summarizing the first set of subtitles.

In some embodiments, the user equipment device 500 uses one or more factors to determine when to generate and/or to update the first context. In some embodiments, a factor may indicate that the first context should be generated based on the first set of subtitles. For example, a first set of subtitles may correspond to a first user, and the user equipment device 500 may generate the first context relating to the first set of subtitles corresponding to the first user. In some embodiments, a factor may indicate that the first context should be generated based on a time frame (e.g., ten seconds, thirty seconds, one minute, ten minutes, etc.). For example, after thirty seconds the user equipment device 500 may generate the first context relating to the first set of subtitles generated during the thirty-second time frame. In some embodiments, a factor may indicate that the first context should be generated based on the subject matter of discussion. For example, whenever the speaker on the video conference concludes speaking about a subject (e.g., first subject), the user equipment device 500 may generate a context (e.g., first context) relating to the first set of subtitles generated during the discussion of the subject. In some embodiments, a factor may indicate that the first context should be generated whenever a user (e.g., user 108) selects a selectable option to generate the first context. In some embodiments, the one or more factors are weighted to determine when to generate and/or to update the first summary.

At 710, the user equipment device 500 displays the first context and the video conference. In some embodiments, the first set of subtitles and/or the first context may be overlaid on the video conference data. In some embodiments, the display resembles the display shown in FIGS. 1A-3B.

Figure 8A:
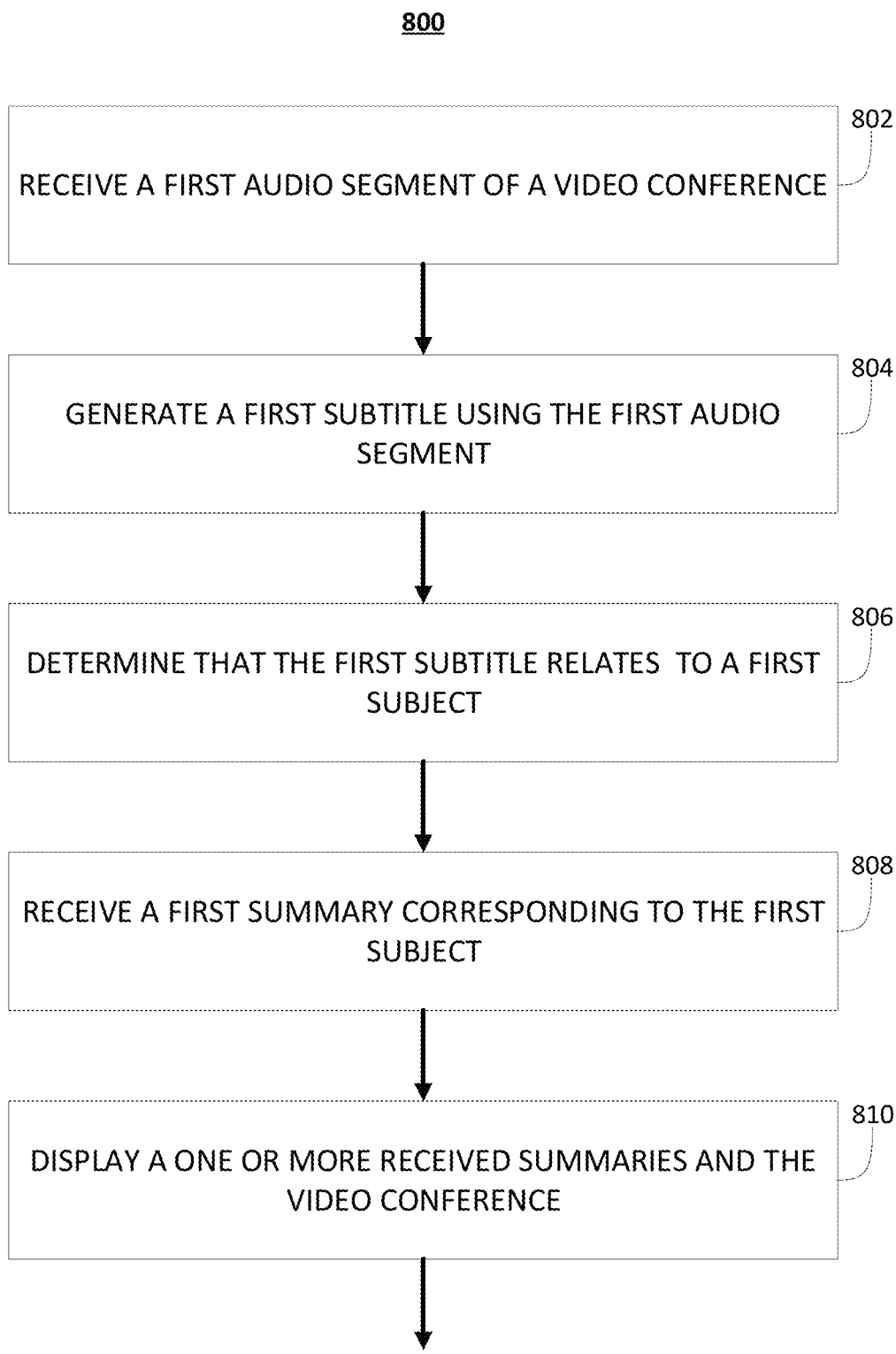
FIGS. 8A and 8B are additional illustrative flowcharts of a process for supplying context to users who access video conferences late, in accordance with some embodiments of the disclosure.
Figure 8B:
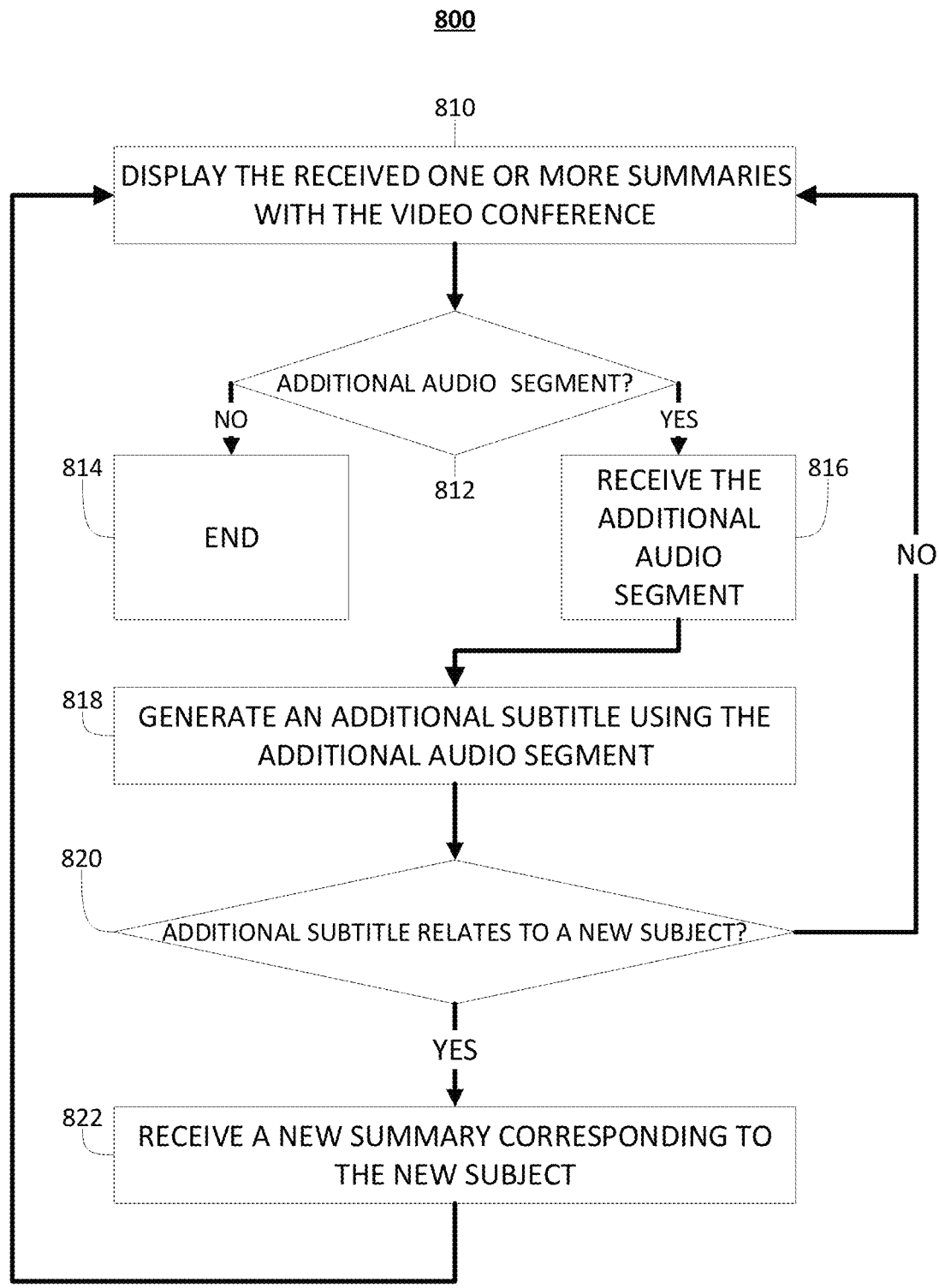

FIGS. 8A and 8B are illustrative flowcharts of a process 800 for providing context to users who access a video conference late, in accordance with some embodiments of the disclosure.

At 802, the user equipment device 500, by control circuitry 504, receives a first audio segment of a video conference. In some embodiments, the user equipment device 500 receives the first audio segment using a microphone (e.g., microphone 516). In some embodiments, the user equipment device 500 receives the first audio segment from a second user equipment device, server, and/or similar such device. In some embodiments, the first audio segment is one or more sounds. In some embodiments, the first audio segment is one or more words. In some embodiments, the first audio segment comprises audio data transmitted during the video conference. In some embodiments, the first audio segment comprises audio data recorded during the video conference.

At 804, the user equipment device 500, by control circuitry 504, generates a first subtitle using the first audio segment. In some embodiments, the generation of the first subtitle is done in conjunction with a second user equipment device, server, and/or similar such device. In some embodiments, the generation of the first subtitle is done using only a second device, and the user equipment device 500 receives the first subtitle and the first audio segment. In some embodiments, one or more speech recognition methodologies (e.g., automatic speech recognition, computer speech recognition, speech to text, etc.) are used to translate the first audio segment into the first subtitle.

At 806, the user equipment device 500, by control circuitry 504, determines that the first subtitle relates to a first subject. In some embodiments, the first subtitle and/or one or more words of the first subtitle may be the same or similar. For example, a first word of the first subtitle may be "rectangle" and the first subject may be "rectangles." In some embodiments, the first subtitle and/or one or more words of the first subtitle are only associated with the first subject. For example, the first word of the first subtitle may be "rectangle" and the first subject may be "shapes." In some embodiments, the first subject may be one word or many words. For example, the first subject may be "relationships that exist between squares and rectangles." In some embodiments, the user equipment device 500 uses one or more natural language process algorithms to determine that the first subtitle and/or one or more words of the first subtitle correspond to the first subject. In some embodiments, the user equipment device 500 has access to a database of one or more subjects. In some embodiments, the user equipment device 500 compares the first subtitle and/or one or more words of the first subtitle to the one or more subjects in the database to determine if the first subtitle and/or one or more words of the first subtitle correspond to the one or more subjects. In some embodiments, the user equipment device 500 determines that the first subtitle and/or one or more words of the first subtitle correspond to more than one subject. In some embodiments, the user equipment device 500 selects one subject of the one or more subjects that correspond to the first subtitle and/or one or more words of the first subtitle. In some embodiments, the user equipment device 500 determines that none of the one or more subjects correspond to the first subtitle and/or one or more words of the first subtitle and generates a new subject corresponding to the first word.

At 808, the user equipment device 500, by control circuitry 504, receives a first summary corresponding to the first subject. In some embodiments, step 808 uses the same or similar methodologies described in step 608 above.

At 810, the user equipment device 500, by control circuitry 504, displays a one or more received summaries and the video conference. In some embodiments, the user equipment device 500 only receives the first summary (in step 808). Accordingly, the user equipment device 500 displays the first summary along with the video conference data. In some embodiments, the user equipment device 500 also displays the first subtitle. In some embodiments, the first summary may be overlaid on the video conference data. In some embodiments the display resembles the display shown in FIGS. 1A-3B.

At 812, the user equipment device 500, by control circuitry 504, determines whether one or more additional audio segments are received. If no additional audio segments are received, the process 800 continues to step 814, where the process 800 ends. If an additional audio segment is received, the process 800 continues to step 816. Although step 812 through step 822 describe one additional audio segment, any number of additional audio segments may be received. For example, if, after receiving a first additional audio segment, the user equipment device 500 receives a second additional audio segment, the process 800 would repeat for each subsequent audio segment.

At 816, the user equipment device 500, by control circuitry 504, receives the additional audio segment. In some embodiments, the additional audio segment is received using the same or similar methodologies described in step 802 above.

At 818, the user equipment device 500, by control circuitry 504, generates an additional subtitle using the additional audio segment. In some embodiments, the additional subtitle is generated using the same or similar methodologies described in step 804 above.

At 820, the user equipment device 500, by control circuitry 504, determines whether the additional subtitle relates to a new subject. In some embodiments, the user equipment device 500 determines that the additional subtitle relates to an additional subject using the same or similar methodologies described in step 806 above. In some embodiments, the user equipment device 500 determines whether the additional subject is a new subject. In some embodiments, a new subject refers to a subject that has not been associated with generated subtitles in process 800. For example, if the additional subtitle relates to the first subject (not a new subject), the process continues to step 810, where the user equipment device 500 displays the first summary along with the video conference data and, in some embodiments, the user equipment device 500 also displays the additional subtitle along with the first summary and the video conference data. In some embodiments, the user equipment device 500 uses the additional subtitle to update the first summary. If the user equipment device 500 determines that the additional subject is a new subject, the process continues to step 822.

At 822, the user equipment device 500, by control circuitry 504, receives a new summary corresponding to the new subject. In some embodiments, the user equipment device 500 receives a new summary using the same or similar methodologies described in step 808 above. After receiving the new summary, the process 800 continues to step 810 where the received one or more summaries (first summary received in step 818, new summary received in step 822) are displayed with the video conference. In some embodiments, the user equipment device 500 also displays the additional subtitle along with the received one or more summaries (first summary received in step 818, new summary received in step 822) and the video conference data.

It is contemplated that some suitable steps or suitable descriptions of FIGS. 6-8B may be used with other suitable embodiments of this disclosure. In addition, some suitable steps and descriptions described in relation to FIGS. 6-8B may be implemented in alternative orders or in parallel to further the purposes of this disclosure. For example, some suitable steps may be performed in any order or in parallel or substantially simultaneously to reduce lag or increase the speed of the system or method. Some suitable steps may also be skipped or omitted from the process. Furthermore, it should be noted that some suitable devices or equipment discussed in relation to FIGS. 1-5 could be used to perform one or more of the steps in FIGS. 6-8B.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method for generating contextual information, the method comprising:
   generating a plurality of subtitles corresponding to a video conference;
   generating a first summary associated with a first subject using a first subset of the plurality of subtitles;
   generating a second summary associated with a second subject using a second subset of the plurality of subtitles;
   storing the first summary and the second summary in a database comprising a plurality of entries, wherein the plurality of entries associates one or more summaries with one or more subjects;
   receiving a first audio segment of the video conference;
   generating a first subtitle comprising a plurality of words using the first audio segment, wherein the first subtitle corresponds to the first audio segment;
   selecting a word of the plurality of words;
   accessing the database comprising the plurality of entries;
   determining that a first entry of the plurality of entries associates the selected word with the first subject; and
   displaying the first subtitle, the first summary, the second summary, and the video conference on a screen of a first device at the same time, wherein:
   the first subtitle and the first summary are displayed in a first format;
   the second summary is displayed in a second format; and
   the first format is different than the second format.

2. The method of claim 1, further comprising:
   receiving a second audio segment of the video conference;
   generating a second subtitle comprising a second plurality of words using the second audio segment, wherein the second subtitle corresponds to the second audio segment;
   selecting a word of the second plurality of words;
   accessing the database;
   determining that a second entry of the plurality of entries associates the selected word of the second plurality of words with the second subject; and
   displaying the second subtitle, the second summary, the first summary, and the video conference on the screen of the first device at the same time.

3. The method of claim 1, wherein the first summary is generated using a natural language process algorithm.

4. The method of claim 1, wherein the video conference is a live video conference.

5. The method of claim 1, wherein the video conference is a recorded video conference.

6. The method of claim 1, wherein the first format corresponds to a first color and the second format corresponds to a second color.

7. The method of claim 1, wherein the first format corresponds to a first indicator and the second format corresponds to a second indicator.

8. The method of claim 1, wherein the first format corresponds to a first font and the second format corresponds to a second font.

9. The method of claim 1, wherein the first format corresponds to a first size and the second format corresponds to a second size.

10. An apparatus comprising:
control circuitry; and
at least one memory including computer program code for one or more programs, the at least one memory and the computer program code configured to, with the control circuitry, cause the apparatus to perform at least the following:
generate a plurality of subtitles corresponding to a video conference;
generate a first summary associated with a first subject using a first subset of the plurality of subtitles;
generate a second summary associated with a second subject using a second subset of the plurality of subtitles;
store the first summary and the second summary in a database comprising a plurality of entries, wherein the plurality of entries associates one or more words summaries with one or more subjects;
receive a first audio segment of the video conference;
generate a first subtitle comprising a plurality of words using the first audio segment, wherein the first subtitle corresponds to the first audio segment;
select a word of the plurality of words;
access the database comprising the plurality of entries;
determine that a first entry of the plurality of entries associates the selected word with the first subject; and
generate the first subtitle, the first summary, the second summary, and the video conference for display at the same time on a screen of a first device, wherein:
the first subtitle and the first summary are displayed in a first format;
the second summary is displayed in a second format; and
the first format is different than the second format.

11. The apparatus of claim 10, wherein the apparatus is further caused to:
receive a second audio segment of the video conference;
generate a second subtitle comprising a second plurality of words using the second audio segment, wherein the second subtitle corresponds to the second audio segment;
select a word of the second plurality of words;
access the database;
determine that a second entry of the plurality of entries associates the selected word of the second plurality of words with the second subject; and
generate the second subtitle, the second summary, the first summary, and the video conference for display at the same time on the screen of the first device.

12. The apparatus of claim 10, wherein the apparatus is further caused to generate the first summary using a natural language process algorithm.

13. The apparatus of claim 10, wherein the video conference is a live video conference.

14. The apparatus of claim 10, wherein the video conference is a recorded video conference.

15. A non-transitory computer-readable medium having instructions encoded thereon that, when executed by control circuitry, cause the control circuitry to:
generate a plurality of subtitles corresponding to a video conference;
generate a first summary associated with a first subject using a first subset of the plurality of subtitles;
generate a second summary associated with a second subject using a second subset of the plurality of subtitles;
store the first summary and the second summary in a database comprising a plurality of entries, wherein the plurality of entries associates one or more summaries with one or more subjects;
receive a first audio segment of the video conference;
generate a first subtitle comprising a plurality of words using the first audio segment, wherein the first subtitle corresponds to the first audio segment;
select a word of the plurality of words;
access the database comprising the plurality of entries;
determine that a first entry of the plurality of entries associates the selected word with the first subject; and
display the first subtitle, the first summary, the second summary, and the video conference on a screen of a first device at the same time, wherein:
the first subtitle and the first summary are displayed in a first format;
the second summary is displayed in a second format; and
the first format is different than the second format.

16. The non-transitory computer-readable medium of claim 15, wherein the control circuitry is further caused to:
receive a second audio segment of the video conference;
generate a second subtitle comprising a second plurality of words using the second audio segment, wherein the second subtitle corresponds to the second audio segment;
select a word of the second plurality of words;
access the database;
determine that a second entry of the plurality of entries associates the selected word of the second plurality of words with the second subject; and
display the second subtitle, the second summary, the first summary, and the video conference on the screen of the first device at the same time.

17. The non-transitory computer-readable medium of claim 15, wherein the control circuitry is further caused to generate the first summary using a natural language process algorithm.

18. The non-transitory computer-readable medium of claim 15, wherein the video conference is a live video conference.

* * * * *